United States Patent

Myer et al.

[15] 3,700,907
[45] Oct. 24, 1972

[54] CODE READING SYSTEM FOR IDENTIFICATION OF MOVING AND STATIONARY OBJECTS UTILIZING NONCOHERENT OPTICS

[72] Inventors: Jon H. Myer, Woodland Hills; Thomas R. O'Meara; John M. Richardson, both of Malibu, all of Calif.

[73] Assignee: Hughes Aircraft Company, Culver City, Calif.

[22] Filed: July 20, 1971

[21] Appl. No.: 164,373

Related U.S. Application Data

[63] Continuation-in-part of Ser. No. 770,241, Oct. 24, 1968, abandoned.

[52] U.S. Cl. .....250/219 D, 250/237 G, 350/162 ZP, 350/321
[51] Int. Cl. .............................................G01n 21/30
[58] Field of Search....250/216 R, 220 R, 219 D, 219 DD, 250/237 G; 340/173 LT, 173 LM; 356/71; 350/162 SF, 162 ZP, 321

[56] References Cited

UNITED STATES PATENTS

| | | |
|---|---|---|
| 3,312,955 | 4/1967 | Lamberts et al......350/162 SF |
| 3,314,052 | 4/1967 | Lohmann.............350/162 SF |

OTHER PUBLICATIONS

Oster et al., Scientific American, Vol. 211, May 1963, pp. 54–63.

*Primary Examiner*—David Schonberg
*Assistant Examiner*—Ronald J. Stern
*Attorney*—W. H. MacAllister et al.

[57] ABSTRACT

For purposes of material handling and inventory management of railway cars, trucks, crates, packaged and unpackaged goods, and similar objects, markings, comprising a plurality or a composite of coded patterns, on such moving and stationary objects are used for their identification or identification of their contents. To permit such identification, an extended source of spatially incoherent light is modulated by passage through or reflection from the markings to provide input images of the coded patterns. The input images are projected through a pair of plates each having a Fresnel zone thereon for transformation of the input images into output signals corresponding to the optical Fourier transforms of the input images. Since the spatial positions and angular orientations of the output signals are dependent upon the spatial frequencies and orientations of the input images, the coded markings comprise a plurality of distinct patterns of different orientation and spatial frequency which can be correlated to a numerical identification system corresponding to information concerning the objects. The system is designed to operate as close to the geometrical optics limit as is practically feasible.

10 Claims, 24 Drawing Figures

PATENTED OCT 24 1972

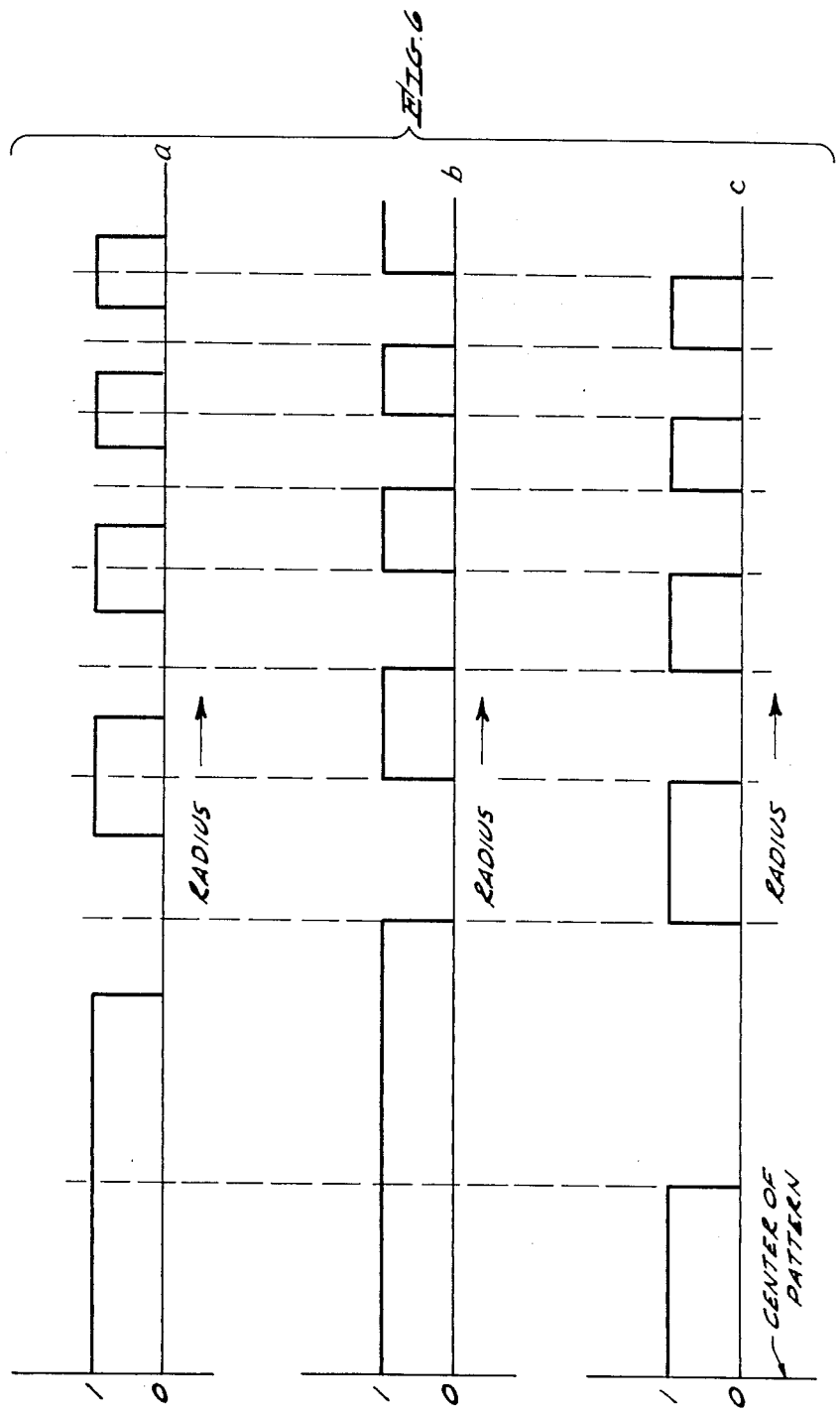

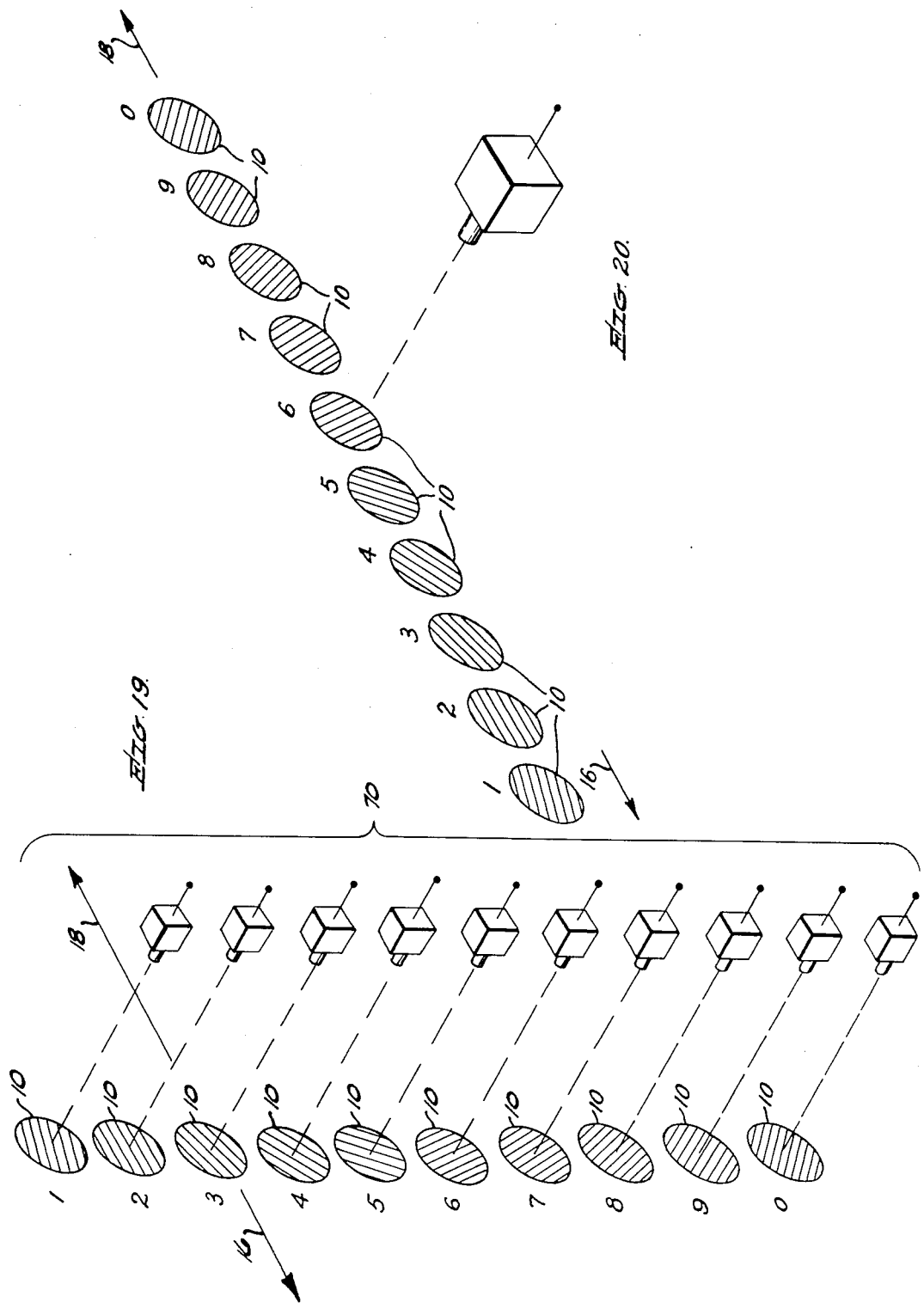

CODE READING SYSTEM FOR IDENTIFICATION OF MOVING AND STATIONARY OBJECTS UTILIZING NONCOHERENT OPTICS

This application is a continuation-in-part of copending patent application, Ser. No. 770,241, filed Oct. 24, 1968, entitled "Code Reading System," now abandoned.

The present invention relates to a new and improved optical system for identifying moving or stationary coded objects from which coded light images are transformed into either identifiable sine transforms or identifiable cosine transforms using noncoherent optics.

Material handling includes the management of quantities of objects such as moving or stationary crates, railroad cars, goods, and inventory items and it is important that pertinent information, such as the location, contents, destination, and other identification concerning these objects, be readily available. In the case of crates, goods and inventory items, such information enables their expedient storage and retrieval and the maintenance of an accurate up-to-date inventory to provide for efficiency and economy of operation. Regarding railroad cars and other moving or rolling stock, the availability of such data can provide information regarding the progress, location and contents of a particular car, train or truck, and the availability of empty cars and the expeditious maintenance of equipment and rolling stock. Acquisition of such pertinent information is sometimes made difficult because many of these objects have a similar or not easily recognizable external appearance.

As a consequence, any identification system should meet at least the following criteria. The means for reading a code identifying the objects or their contents should at least be capable of automatic retro-directive operation and perform with sufficient rapidity and flexibility to detect a non-moving code as well as a code moving at velocities exceeding, for example, 80 miles per hour. The code itself should be made of durable materials capable of withstanding all weather and wear conditions. Additionally, an optical code reader should be economical to build, contain no moving parts so as to be easy to install, maintain and adjust, and be insensitive to diverse weather conditions, level and kind of illumination and to the distance between the code and the code reader. Furthermore, the code itself and the output of the reader should be easily recognized by an unskilled operator.

A number of different systems have been devised to provide for the automatic generation of inventory and rolling stock data; however, they have not been entirely successful in meeting the above-stated preferred characteristics. For example, one prior optical system utilizes color coding techniques. The use of colored indicia as coded designators, however, requires considerable maintenance because the colored indicia are highly susceptible to bleaching as a result of constant exposure to sunlight and diverse weather conditions. Another system involves mechanisms utilizing coherent light sources and optical readers having costly, complex rotating mirror and lens assemblies which are not well suited for unattended outdoor operation over an extended period of time. A further system employs correlation techniques wherein masking devices are used to detect the presence of particular coded characters. These systems have generally had the shortcoming of being able to operate only with objects having low passing velocities. Additionally, accurate positioning is necessary to provide successful operation. Such systems are further handicapped for employment with railroad cars which are characteristically subject to a lateral rocking or swaying motion.

The present invention overcomes and avoids these and other problems by providing an optical reading system which operates essentially in a passive manner, which has no moving parts, and which is capable of automatically reading coded indicia regardless of direction of traversal of either a moving object or a moving reader. To this end, the present invention, when employed to provide inventory or railroad car information, presents the advantage of an economical, durable reader that is easy to install, maintain and operate over extended periods of time under all weather conditions, and that will perform in conjunction with coded which are stationary or have having high passing velocities.

Briefly described, the present invention includes an optical system operating as close to the geometrical optics limit as is practically feasible for automatically reading coded indicia located on stationary and moving objects to be identified. As a corollary, the reader may be moved across stationary objects, such as railway cars parked in a car yard.

More particularly, the desired identification of the objects is accomplished by the use of coded reflective markers or labels placed on each of the objects to be identified. Preferably, the markers comprise a composite or series of bar patterns having specific widths and orientations according to an identification code. Spatially incoherent light from an extended source is reflected from the markers to produce input images which are automatically read by an optical code reader located at a reading station. Specifically, The optical code reader includes an optical transformer including a pair of Fresnel zone transparencies. When the spatially incoherent light from the source is reflected from the markers, the light is modulated in accordance with the marker pattern to provide input light images. These input images are then directed through the Fresnel zone transparencies which transform the images in such a manner as to produce output signals corresponding to the optical Fourier transforms of the input image signals. These output Fourier transform signals are formed in an output plane where they are detected by an appropriate number of suitably positioned photo-sensing devices.

In the prior art, coherent light has been passed through a Fresnel zone plate in such a manner as to cause the Fresnel zone to act as a lens. The light images thereby produced may be superficially compared to those produced by the present invention, but, in reality, are quite different because their production results from the use of diffraction techniques based upon Fraunhofer, coherent optics principles. Diffraction techniques are generally more expensive, cumbersome, and difficult to use due to the critical parameters of the required components. Diffraction techniques require the use of monochromatic light which is projected through the combination of a transparency capable of forming the input image and a lens to produce the desired output image. When the input image is formed as a bar pattern, the transparency comprises a diffraction grating. All operations employing diffraction phenomena require critical dimensional control of the optical components used.

Conceptually, the present invention differs from prior art diffraction techniques in that the output images of the present invention are not produced by diffraction of coherent light but by obstruction of noncoherent light. While an output image produced by diffraction may be mathematically described as the spatial power spectrum of the input image, which is the sum of the squares of the sine and cosine transforms, in the present invention these transforms are individually and directly produced as distributions of light intensity in the output plane. To accomplish these results of the present invention, diffraction effects must be minimized, since they would seriously interfere with its performance so as to make it inoperative.

Structurally, the present invention is not restricted by the use of components having critical parameters and, thus, provides greater versatility at less expense when compared to diffraction techniques. For example, the present invention does not require the use of monochromatic light, as required by diffraction techniques, but instead permits the use of polychromatic or white light. Further, as distinguished from diffraction techniques, neither a miniature light source nor a critically flat transparent grating are required. Thus, the present invention can use large light sources, such as extended sources of light, e.g., spotlighting or sunlight, which provide the required diffuse or spatially incoherent light and which have an appropriately wide aperture, therefore allowing for greater light intensity. Additionally, the input image or signal can be presented in a variety of convenient formats.

It is, therefore, an object of the present invention to provide a new and improved optical system for identifying moving and stationary objects.

Another object is to provide a passive code reading system.

Another object is to provide an optical code reading system that is suitable for employment as an identification and/or classification system for railway cars or for inventory items in a warehouse.

Another object is to provide such a system which is operable by ordinary sources of light, such as spotlighting and sunlight.

Another object is to provide an optical code reader that does not include moving parts.

Another object is to provide an economical optical code reading system that is easy to construct, install, maintain and operate over extended periods of time under all weather conditions.

Another object is to provide an optical code reading system that is capable of reading coded markers on stationary or on moving objects having high passing velocities.

Other aims and objects and many of the attendant advantages of the present invention will be more readily appreciated as the same becomes better understood by reference to the following detailed description of exemplary embodiments which are to be considered in connection with the accompanying drawings in which like reference symbols designate like parts throughout the figures thereof and wherein:

FIG. 6 illustrates curves $a$, $b$, and $c$ which are useful in discussing a second embodiment of the present invention configured as a sine transformer;

FIG. 17 is a diagram illustrating a different plurality of single representations of parallel bar patterns each having angular orientation for use as the basis of a numerical coding scheme for forming input images;

FIG. 18 is a diagram illustrating the angular orientations a plurality of conjugate loci of the output transform image signals corresponding to the orientations of each of the bar pattern input images of FIG. 17;

FIG. 19 is a schematic diagram illustrating a first exemplary marker arrangement for producing in parallel specific input images and the detection of their transforms;

FIG. 20 is a schematic diagram illustrating a second exemplary marker arrangement for producing a series of specific input images and the detection of their transforms;

Figure 1:
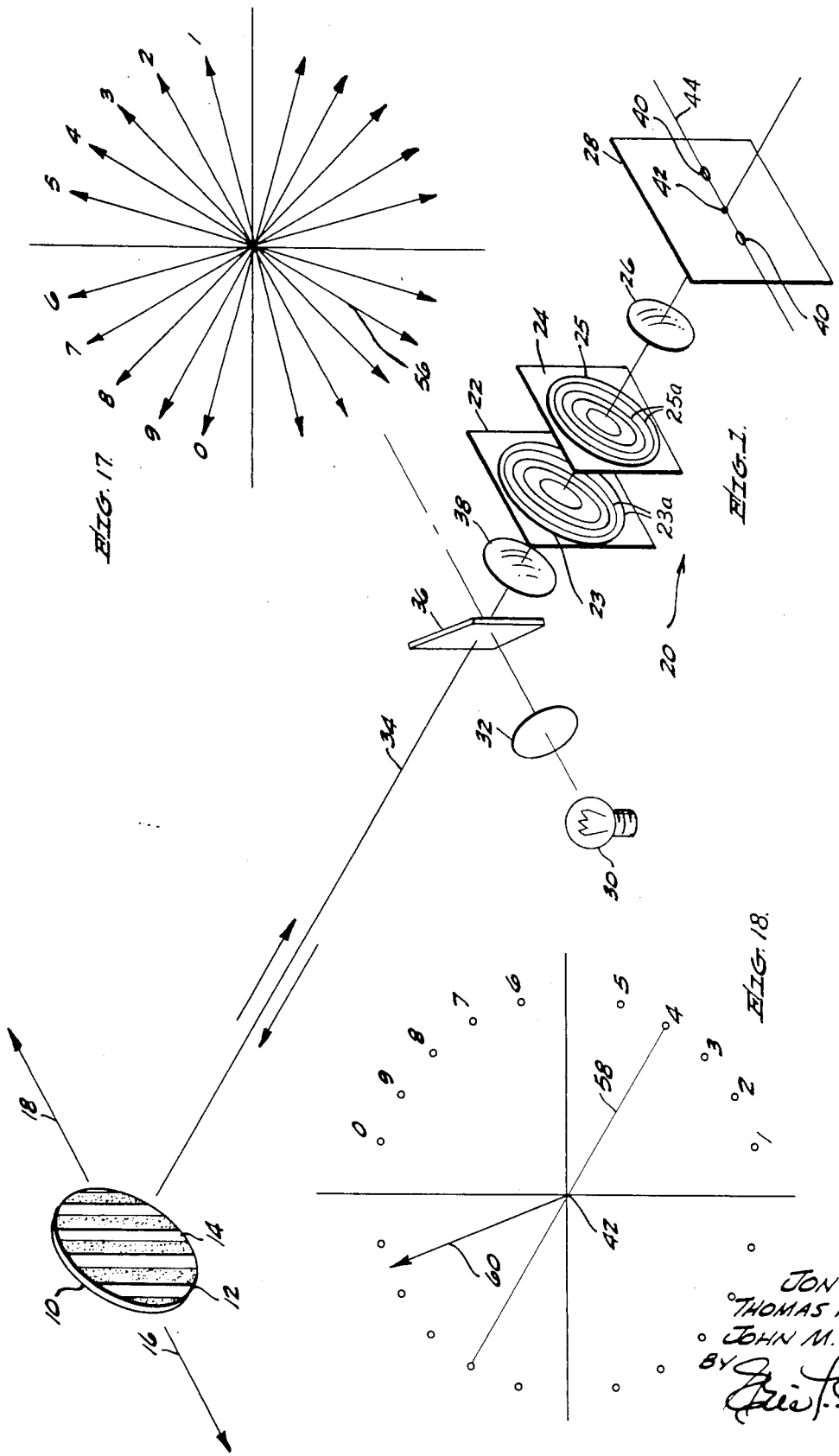
FIG. 1 is a schematic diagram illustrating a preferred embodiment of a code reading system in accordance with the present invention.

Accordingly, with reference to FIG. 1, a reflective marker 10, or other equivalent input image forming means, having substantially non-reflective bars 12 separated by light reflective areas 14 to form a specific, illustrative graphic bar pattern code, may be used as indicia to be read by the optical code reader of the present invention. Reflective marker 10 is assumed to be adapted for bi-directional motion across the field of view of the code reader by being mounted on a railway car or other moving object, as indicated by arrows 16 and 18; however, the reading will not change if the marker is stationary or if the reader moves with respect to the marker. The reflective marker may include corner cube elements, having a trihedral angle with mutually perpendicular sides, which will reflect incident light in the direction of the light source regardless of the incident angle.

Input image forming means 10 is illuminated by an extended source 30 of spatially incoherent light, the rays of which are collimated by a lens 32 and reflected in the direction of marker or label 10 along the system axis 34 by a partially transparent mirror 36. The light rays are reflected from marker 10 and are thereby modulated to provide input images of the graphic bar pattern. The input images pass through the partially transparent mirror and are appropriately focused by a lens 38 on a Fourier transformer 20 which comprises a pair of transforming transparencies 22 and 24 having Fresnel zones 23 and 25 thereon for transforming the input images into individual sine or cosine light signals, a lens 26 and an output or transform plane 28 on which the Fourier transform signals are focused by lens 26. Each transparency may be made of any material or combination of materials that will provide a medium having the characteristic of being transparent. Lens 38 serves as a telescope and projects a real image of the code marker onto a plane which may be coincident with or proximate to the planes of either of transforming transparencies 22 or 24.

Figure 2:
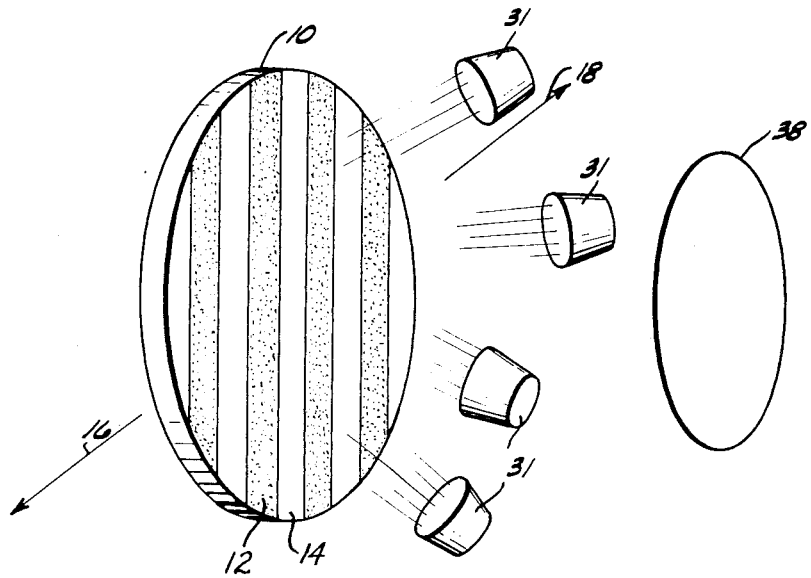
FIG. 2 is a schematic diagram illustrating a means alternate to that of FIG. 1 for providing an extended source of spatially incoherent light.

FIG. 2 illustrates an alternate method of illuminating input image forming means 10 wherein a plurality of conventional extended sources 31 of spatially incoherent light arranged about axis 34 are directed at input image forming means or marker 10. As a further alternate, sufficiently strong sunlight can be used as the source of light.

The Fourier transform signals produced by transparencies 22 and 24 are represented mathematically as a complex function having a real portion (i.e., cosine transform) and an imaginary portion (i.e., sine transform). This complex function serves to define the spatial frequency content of the input image.

Physically, a cosine transform signal, for example, takes the form of output light signals produced on an output plane, such as transform plane 28, by projecting spatially incoherent light from an extended source of light through a pair of Fresnel zones, such as zones 23 and 25, towards the output or transform plane. The sine transform is produced in a similar manner, with a modification of the Fresnel zone plates. For both the sine and cosine transforms, the spatially incoherent light is modulated by an input pattern or the like, such as marker 10, to provide input light images of spatially incoherent light and to produce output signals on the output plane corresponding to the transformed input images.

Figure 4:
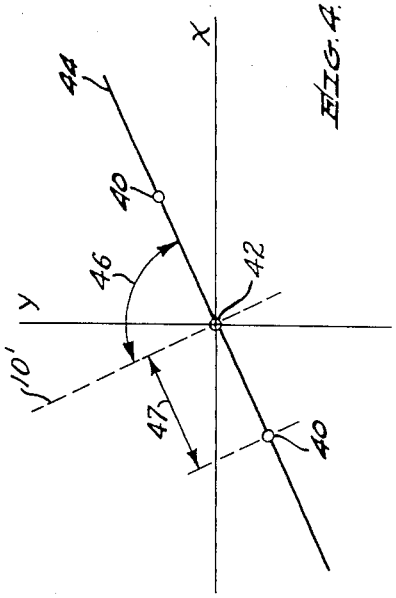
FIG. 4 depicts an output cosine signal representing the transform of the input image of FIG. 3.
Figure 3:
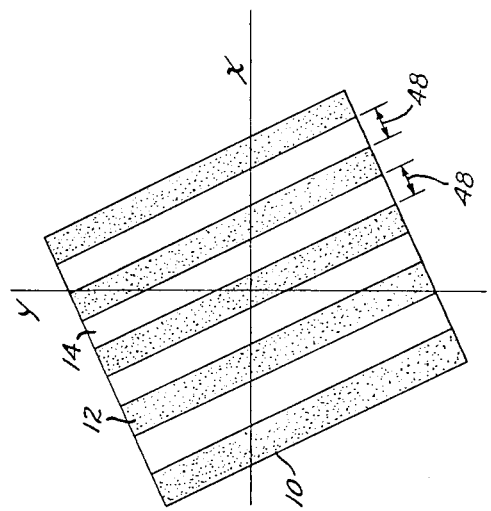
FIG. 3 illustrates an input image which appears prior to transformation and which is provided by the reflective marker of FIGS. 1 or 2.

As illustrated in FIGS. 1, 3 and 4, as a result of using an input light image produced from the modulation of the spatially incoherent light by graphic bar pattern 10, whose bars 12 and 14 are arranged in a spaced parallel relationship as shown in FIG. 3, the cosine transform of the input bar pattern light image takes the form of conjugate loci depicted as a pair of spaced circular zones or dots 40 (see FIG. 4) which correspond to the fundamental spatial frequency of the input light image. These zones or dots appear on the output plane and are equally spaced from a center point 42 of output plane 28 on an imaginary straight line 44. Point 42 lies on axis 34. Line 44 extends through the center point and is rotated 90°, as illustrated by arc 46, from the input bar pattern image, which is represented in FIG. 4 by dashed line 10' as a superimposition thereon for illustrative purposes. It is to be understood, of course, that pattern 10' does not, per se, appear on output plane 28.

The distance 47 of circular zone or dot signals 40 from center 42 on the transform plane is dependent, in inverse proportion, on the spatial frequency or width 48 of bars 12 and 14 of the input light image. Consequently, as the spatial frequency of the graphic bar pattern image is increased, that is, as the width of the bars or as the distance between bars is decreased, the distance from each of the circular zones to the center of the output plane is proportionately increased, as will become apparent from the discussion of FIGS. 12 and 13, in particular.

The orientation of imaginary straight line 44 extending through the conjugate loci and the center point of the output plane is also dependent on the orientation of bars 12 and 14 forming the graphic pattern of the input light image. As stated above, this imaginary straight line will always be orthogonal to the bars.

Because the bar pattern image is composed of the superposition of many sinusoidal patterns, representing the fundamental spatial frequency and its "harmonics," additional circular zones or dots of much weaker intensity and corresponding to the harmonics will appear on the same imaginary straight line. Such additional zones, however, do not interfere with the working of the present invention.

The conjugate loci for any particular graphic multiple parallel bar pattern will remain stationary on output plane 28 when reflective marker 10 is moving across the field of view of and relative to the code reader in either of the directions indicated by arrows 16 or 18. The only result of such movement is an intensity modulation of the loci at a frequency which is proportional to the passing velocity of marker 10, the spatial frequency of the graphic bar pattern, and the inclination of bars 12 relative to the direction of motion. Bars oriented parallel to the direction of motion will result in conjugate loci of the transform image which are not intensity modulated and which have a constant intensity.

As described above with reference to FIG. 1, the system of the present invention includes the pair of transforming transparencies 22 and 24, lens 26, if needed, and output plane 28, all of which are respectively aligned along an axis 34 and arranged in a mutually parallel relationship. An extended source 30 or 31 of spatially incoherent light and an input image forming means 10 complete the system.

Each of the transforming transparencies has Fresnel zones 23 and 25 therein. As is well known, a Fresnel zone pattern includes a plurality of concentric circles or rings wherein each successive circle has a radius proportional to the square root of successive integers starting with numeral "1" and wherein the alternate areas formed by adjacent circles are darkened to form a pattern of alternating opaque and transparent concentric rings. More generally, the circles or rings may have a radius proportional to the square root of successive integers from which a constant fractional quantity has been subtracted. For use in the present invention, however, there are certain limitations in the construction of the zone pattern, as will be more fully described hereinafter with reference to the mathematical explanations of the present invention. Qualitatively, the Fresnel zone patterns are constructed both to minimize diffraction effects by increasing the focal length of each zone pattern far beyond output plane 28 and to make the Moire errors of the combined zone patterns small.

As stated above, lens 26 is used, if needed. This requirement depends on the scaling of Fresnel zone patterns 23 and 25. If the zone patterns are identically scaled, the output image without lens 26 will form at infinity. To avoid this impractical result, lens 26 is included as shown in the illustrated embodiment of FIG. 1 to converge the output image on output plane 28. Alternatively, this result can be obtained without the use of a converging lens if the rings of the Fresnel zone patterns are scaled in such a manner that the rings 23a of zone pattern 23 are proportionately larger than the rings 25a of zone pattern 25 to permit each set of parallel light rays converging on the center of output plane 28 to pass through corresponding rings of each of the Fresnel zone patterns. Otherwise stated, any one pencil beam of light of infinitely small diameter passing through the "$n^{th}$" ring of zone pattern 23 also passes through the "$n^{th}$" ring of zone pattern 25, where the former "$n^{th}$" ring is further distanced from axis 34 than the latter "$n^{th}$" ring. Since zone pattern 23 is of larger scale than zone pattern 25, all pencil beams for the corresponding rings of the two patterns form an imaginary cone having its apex at center 42 of the output plane.

In order to further understand the operation of the present invention, the effect, called the Moire effect, obtained by use of a pair of Fresnel zone plates is first described when the input light from an extended source of spatially incoherent light is not modulated by the input image forming means. Thereafter, the effects of the input image forming means are described. It bears repeating that, in this discussion, the diffraction effects of the Fresnel zones must be minimized.

A Moire effect occuring between transforming transparencies or plates 22 and 24, as a result of respective Fresnel zone patterns 23 and 25 thereon, is an essential aspect of the operation of the invention. It is well known that two such transparencies, when placed together in a superimposed fashion but with a center displacement, will produce a visible plane wave "beat" or Moire pattern which has wave fronts extending orthogonal to the direction of the displacement. The spatial frequency of the Moire pattern is directly proportional to the center displacement between the superimposed transparencies. Similarly, a zone plate interacting with a plane wave pattern will produce a Moire pattern composed of three Fresnel zones, of which the center zone is identical with the original zone on the zone plate. See "Proceedings of the Symposium on Modern Optics," Polytechnic Press of the Polytechnic Institute of Brooklyn, Brooklyn, N.Y., Mar. 22, 23, 24, 1967: p. 546, FIG. 2; p. 547, FIG. 4; p. 548, FIG. 5. The same Moire pattern can be observed by viewing the separated transforming transparencies through a small aperture at any point on output plane 28 other than its center 42. In this case, however, the spatial frequency and the direction of the wave fronts of the visible Moire pattern are dependent on the amount and direction of the displacement of the observation point relative to the center point. Otherwise explained, different plane wave "beats" or Moire patterns will be observed from different observation points.

When rays of incoherent light are directed at transforming transparencies 22 and 24, the light rays passing therethrough are modulated in accordance with the Moire pattern formed by the two Fresnel zones. Alternately stated, the intensity of the light reaching the output plane may be calculated for each light path by multiplying the intensity function of projected light rays taken at the light source by a Moire pattern transmission coefficient that varies with position.

The total light intensity at any given point on output plane 28 due to all light rays converging at the given point is proportional to the integral of the product of the projected light intensity function and the Moire pattern transmission coefficient.

When the input light from the light source is modulated by an input image forming means, the total light intensity at any given point on the output plane is proportional to the integral of the product of the input image function and the Moire pattern transmission coefficient.

The transformation process may be alternately described as follows. When a large zone plate transparency is superimposed at a distance over a smaller zone plate transparency and is transilluminated, then the locus for all possible Moire line patterns will be on the transform plane at the pseudo-focal length of the two zone plates. This infinite member of Moire pattern loci averages out in summation and will be invisible. The introduction of a parallel line grid anywhere in the converging ray bundle will subtract one complementary Moire pattern from the field and make the two loci for that particular pattern visible on the transform plane.

A more complete understanding of the invention may b further obtained by a mathematical analysis of the device which is designed to operate as close to its geometrical optics limit as is practically possible. In the following analysis the strict hypothetical geometrical optical limit is first assumed and later a rough investigation is made of undesired diffraction effects, which cannot be eliminated from any practical physical embodiment of the invention. The discussion will first deal with the operation of the cosine transformer. The modifications necessary to obtain a sine transformer will then be discussed.

Figure 5:
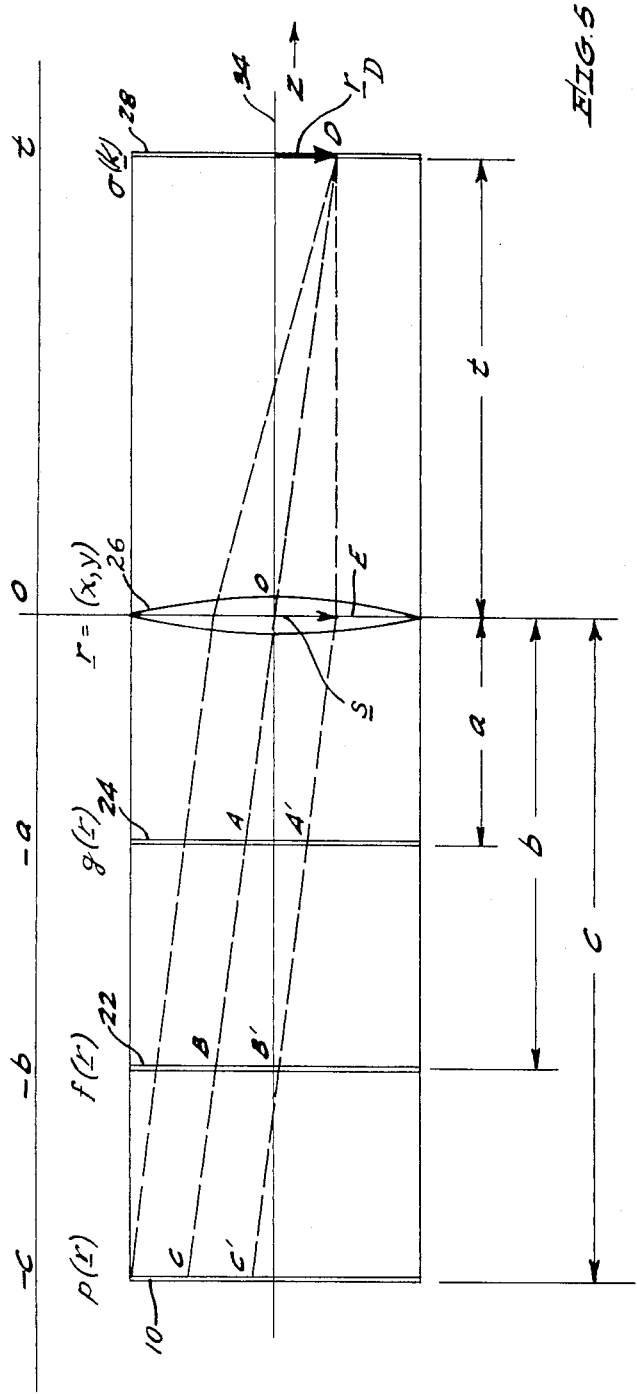
FIG. 5 is a schematic diagram useful in understanding the mathematical explanation of one embodiment of the present invention comprising a cosine transformer.

Commencing with the discussion of the cosine transformer with reference to FIG. 5, a displacement perpendicular to longitudinal axis 34 is denoted by the two dimensional vector $\underline{r} = (x,y)$. A position on axis 34 is denoted by the scalar coordinate z. Thus, the position of a point in three dimensional space is specified by both $\underline{r}$ and $z$. The element of area in a plane perpendicular to the longitudinal axis is denoted by $d^2\underline{r}$, where $d^2\underline{r} = dxdy$. A spatial frequency vector will be denoted by the vector $\underline{k} = (p,m)$.

The origin, designated "0," of the coordinate system is placed in the center of lens 26 with the z-axis coincident with longitudinal axis 34. The position in any plane perpendicular to the axis is denoted by vector $\underline{r}$. All of the elements of the present invention, including input image forming means 10, transforming Fresnel zone transparencies 22 and 24, lens 26, and output plane 28, are oriented perpendicular to longitudinal axis 34. Although means 10 may not necessarily be perpendicular to the z-axis, the input image will be as it passes through transparencies 22 and 24. The input image forming means, placed at $z = -c$, has a transmission coefficient $\rho(\underline{r})$. Transforming transparencies 22 and 24 are respectively placed at $z = -b$ and $z = -a$, and have transmission coefficients of $f(\underline{r})$ and $g(\underline{r})$, respectively. Transform field or output plane 28 is positioned at $z = t$ where t is the focal length of lens 26. The intensity on this plane is denoted by $o(\underline{k})$. On this plane, $\underline{k}$ is proportional to the actual position $r$ in a manner to be subsequently determined.

Considering a set of rays converging at the point D in output plane 28, the central ray passing through origin "0" is defined by the vector equation $$\underline{r} = (z/t)\underline{r}_D \quad (1)$$

where $r_D$ is the vector whose direction and magnitude extends from the origin to point D on output plane 28. A typical ray passing through a non-central point E on lens 26 is generally defined by the vector equation $$\underline{r} = (z/t)\underline{r}_D + \underline{s} \text{ where } z \leq 0, \quad (2)$$

which equation is reduced to $\underline{r} = \underline{s}$ in the median plane of lens 26. Such a non-central ray will pass through a point A' on transforming transparency 24 at $$\underline{r} = -(a/t)\underline{r}_D + \underline{s}, \quad (3)$$

through a point B' on transforming transparency 22 at $$\underline{r} = -(b/t)\underline{r}_D + \underline{s}, \quad (4)$$

and through a point C' on image forming means 10 at $$\underline{r} = -(c/t)\underline{r}_D + \underline{s}. \quad (5)$$

Any ray passing through transparencies 24 and 22 and through image forming means 10 will be attenuated by a factor equal to the product of the functions $g$, $f$, and $\rho$ evaluated at respective points A', B', and C'. Summing all rays converging at point D on output plane 28, the light intensity at that point is defined by the expression $$\rho(\underline{r}_D) = \mu \int d^2\underline{s} \rho(\underline{r}_{C'}) f(\underline{r}_{B'}) g(\underline{r}_{A'})$$
$$= \mu \int d^2\underline{s} \rho\left(\underline{s} - \frac{c}{t}\underline{r}_D\right) f\left(\underline{s} - \frac{b}{t}\underline{r}_D\right) g\left(\underline{s} - \frac{a}{t}\underline{r}_D\right)$$
$$= \alpha \int d^2\underline{r} \rho(\underline{r}) f\left(\underline{r} + \frac{c-b}{t}\underline{r}_D\right) g\left(\underline{r} + \frac{c-a}{t}\underline{r}_D\right), \quad (6)$$

where $\mu$ is a system parameter proportional to the intensity of the source of diffuse illumination. For the sake of simplicity, the ranges of integration in equation (6) are assumed to be infinite, but with $\rho(\underline{r})$ vanishing outside of a finite domain.

Assuming that functions $f$ and $g$ correspond to identical Fresnel zone transparencies, in this case transparencies having Fresnel zone patterns thereon, functions $f$ and $g$ at corresponding points on transparencies 22 and 24 will be equal. These functions, each of which gives the transmission coefficient as a function of position, may be defined as $$f(\underline{r}) = g(\underline{r}) = \alpha + \beta \cos \gamma r^2, \quad (7)$$

where $\alpha$, $\beta$ and $\gamma$ are constant parameters and where $r$ is the magnitude of $\underline{r}$. In order that transmission coefficients $f(\underline{r})$ and $g(\underline{r})$ lie between zero and unity, parameters $\alpha$ and $\beta$ must satisfy the two inequalities $$\alpha + \beta < 1 \text{ and} \quad (8)$$
$$\alpha - \beta > 0.$$

The multiplier of $\rho(\underline{r})$ in the integrand of the last line of equation (6) can then be given by $$f\left(\underline{r} + \frac{c-b}{t}\underline{r}_D\right) g\left(\underline{r} + \frac{c-a}{t}\underline{r}_D\right)$$
$$= \alpha^2 + \frac{1}{2}\beta^2 \cos(\underline{k} \cdot \underline{r} + \delta) + R(\underline{r}, \underline{k}), \quad (9)$$

where the spatial frequency vector $k$ is related to $r_D$ by the expression $$\underline{k} = 2\gamma(b-a)/t \, \underline{r}_D \quad (10)$$

and where the phase shift $\delta$ is given by $$\delta = (2c-b-a)/4\gamma(b-a) \, k^2. \quad (11)$$

The remainder term, which may be termed the "Moire error" and which is assumed to give a negligible contribution to the integral, is given by the expression $$R(\underline{r}, \underline{k}) = \alpha\beta \left[ \cos \gamma \left| \underline{r} + \frac{c-b}{2\gamma(b-a)}\underline{k} \right|^2 \right.$$
$$\left. + \cos \gamma \left| \underline{r} + \frac{c-a}{2\gamma(b-a)}\underline{k} \right|^2 \right]$$
$$+ \frac{1}{2}\beta^2 \cos 2\gamma \left[ r^2 + \frac{2c-b-a}{2\gamma(b-a)}\underline{k} \cdot \underline{r} \right.$$
$$\left. + \frac{(c-b)^2 + (c-a)^2}{8\gamma^2(b-a)^2}k^2 \right] \quad (12)$$

in which $k$ is the magnitude of $\underline{k}$. Inserting equation (9) into the last line of equation (6) and neglecting the remainder $R(\underline{r},\underline{k})$, the desired result is obtained $$\sigma(\underline{k}) = V \int d^2\underline{r}\rho(r) + W \int d^2\underline{r}\rho(r) \cos(\underline{k} \cdot \underline{r} + \delta) \quad (13)$$

in which $\sigma$ is written as a function of $\underline{k}$ instead of $r_D$ and the constants, V and W, are given by the expressions $$V = \alpha^2 \mu \quad (14)$$

$$W = \tfrac{1}{2}\beta^2 \mu$$

where $\alpha$ and $\beta$ are defined by equation (7). The domain of integration in equation (13) can be made effectively finite by requiring $\rho(\underline{r})$ to vanish outside of a finite domain. It is to be noted that the phase shift $\delta$ can be made to vanish if $c = \tfrac{1}{2}(a+b)$, that is, if the image forming means is placed exactly one-half the distance between identical transforming transparencies 22 and 24.

The sine transformer may be obtained by making rather minor modifications. Initially, it is necessary that functions $f(\underline{r})$ and $g(\underline{r})$ be not identical; specifically, equations (7) must be replaced by $$f(\underline{r}) = \alpha + \beta \cos \gamma r^2 \quad (15)$$

$$g(\underline{r}) = \alpha + \beta \sin \gamma r^2 \quad (16)$$

where $\alpha$ and $\beta$ are subject to the same conditions as before.

Structurally, this means that the rings or circles of one of the pair of transforming transparencies 22 and 24 (FIG. 1) must be effectively displaced by 90°. This displacement is illustrated by waveforms $\underline{a}$, $\underline{b}$, and $\underline{c}$ of FIG. 6 which represent the relative transparency of one-half of a Fresnel zone pattern wherein the zero amplitude level is representative of the opaque rings of a Fresnel zone pattern and the unity amplitude level is representative of the transparent rings. If waveform $\underline{a}$ shown in FIG. 6 is assumed to be the reference transforming transparency, then waveform $\underline{b}$ shown in FIG. 6 illustrates a 90° displacement which has been provided as shown by increasing the radius of each ring forming the Fresnel zone pattern by an amount equal to one-half the width of the ring. Waveform $\underline{c}$ of FIG. 6 illustrates a 90° displacement which has been provided by decreasing the radius of each ring forming the Fresnel zone pattern by an amount equal to one-half the width of the ring.

Resuming them mathematical analysis of the sine transformer, equation (9) can be replaced by the expression $$f\left(\underline{r} + \frac{c-b}{t} \underline{r}_D\right) g\left(\underline{r} + \frac{c-a}{t} \underline{r}_D\right)$$

$$= \alpha^2 + \tfrac{1}{2} \beta^2 \sin(\underline{k} \cdot \underline{r} + \delta) + R'(\underline{r}, \underline{k}) \quad (17)$$

where $\underline{k}$ and $\delta$ are defined, as before, by equations (10) and (11). The remainder term or Moire error $R'(\underline{r},\underline{k})$ is different in detail from the previous remainder term $R(\underline{r},\underline{k})$ but the qualitative behavior remains the same and hence it need not be discussed further. Neglecting the present remainder term, one then obtains $$\sigma(\underline{k}) = V \int d^2 \underline{r} \rho(\underline{r}) + W \int d^2 \underline{r} \rho(\underline{r}) \sin(\underline{k} \cdot \underline{r} + \delta) \quad (18)$$

Thus, the substitution of non-identical transparencies having transmission coefficients $f(\underline{r})$ and $g(\underline{r})$ defined by equation (15) for the identical transparencies defined by equation (7) will yield the sine transform of $\rho(\underline{r})$.

It is to be noted that the mathematical description above involves Fresnel zone patterns with continuously varying transmission coefficients as given by equations (7), (15) and (16) whereas the structural description involves Fresnel zone patterns whose transmission coefficients vary discontinuously between zero and one; i.e., they are either totally transparent or opaque at each point. In actual practice, the Moire patterns produced by each of the types of Fresnel zone patterns are only very slightly different. Consequently, the use of Fresnel zone patterns having transmission coefficients which vary discontinuously gives a good approximation of the idealized cosine or sine transformer described in the mathematical analysis.

Referring once again to FIG. 1, it is understood that it would be within the scope and spirit of the invention to make several modifications in the illustrated system configuration. For example, although input image forming means 10 is embodied as reflective marker, it may be embodied as a transparency provided that light may be projected through it towards the Fresnel zone plates.

Further, when the use of lens 26 is needed, the focal length of the lens may be so selected as to permit output plane 28 to be placed at any distance whatsoever from the remaining components of the system. Thus, a lens of any focal length may be used, but not being required, as explained above, the lens may be eliminated altogether provided that the Fresnel zone scales of axially aligned transform transparencies 22 and 24 are appropriately sized to allow rays, which are projected towards center 42 of output plane 28, to pass through corresponding points of the respective Fresnel zone patterns 23 and 25. Under such circumstances, the Fresnel zone scales can be sized to permit location of the output plane at any desired distance from the remainder of the system.

Additionally, each of Fresnel zone patterns 23 and 25 may be either positive or negative. A positive Fresnel zone pattern is one having a dark or opaque center whereas a negative pattern has a light or transparent center. The use of two negative Fresnel zone patterns will produce the same results as when two positive Fresnel zone patterns are used. However, the employment of two different Fresnel zone patterns, one negative and one positive, results in a change of sign of the cosine (or sine) transform, i.e., the second term on the right hand side of equations (13) or (18).

Another modification is that each of the Fresnel zone patterns may be phase-shifted by an arbitrary amount without altering the operation of the device in an essential way. In a mathematical sense, a Fresnel zone pattern may be phase-shifted by making the substitution $$\cos \gamma r^2 \quad \cos(\gamma r^2 + \psi) \quad (18a)$$

for $\cos \gamma r^2$ in equation (7) or in making a similar substitution in equations (15) and (16) where $\psi$ is a predetermined angular increment.

To complete the analysis of the invention, it is desirable to consider the undesired diffraction effects and the conditions under which these effects can be neglected. It is assumed that input image forming means 10 is opaque beyond the radius $r = R$ and also that it is bandwidth limited in a spatial frequency sense, namely that the Fourier transform vanishes for $k > k_{max}$. In order that the bandwidth limitation be expressed in a manner invariant to scale change, it is required that $$k_{max} = 2\pi/R \, n_l \quad (19)$$

where $n_l$ is the number of line pairs, corresponding to $k_{max}$, within the field of view bounded by a circle of radius R. Assuming this same arrangement as that illustrated in FIG. 5, the diffraction from the rings in the neighborhood of $r = R$ on the Fresnel zone plate at $z = -b$ produces a blurring on the output plane characterized by the distance $$d = 1/\pi \gamma R(t+b) \lambda \quad (20)$$

where $\lambda$ is a typical wavelength of light and where $\gamma$ is the constant introduced in equation (7). It is then required that $d$ be smaller than the fraction $\eta$ times the radius of the circle on the output plane corresponding to $k_{max}$. This implies the inequality $$\frac{4}{\eta} \left( \frac{(t+b)(b-a)}{t^2} \right) \frac{\lambda t}{R^2} n_Z^2 < n_I \quad (21)$$

where $n_Z$ ($=\gamma R^2/2\pi$) is the number of concentric rings on the Fresnel zone plate having radii less than R. The requirement above is equivalent to the requirement that the focal length $f_Z$ ($=R^2/2n_Z\lambda$) of the Fresnel zone plate be much longer than the device, if the points on the output plane corresponding to $k_{max}$ are required to have a radius R. With this last condition, equation (21) reduces to $$t + b < \eta f_Z \quad (22)$$

which shows that the lensing action of the Fresnel zone plate is alien to the concept and operation of the present invention.

The making of $n_Z$ is arbitrarily small, in order to minimize diffraction effects, leads to large Moire errors associated with the remainder term $R(\underline{r},\underline{k})$ defined by equation (12). To make these errors small for the part of the input image between $r = \zeta^{1/2}R$ and $r = R$, the following inequality must be satisfied $$n_I < 2n_Z \zeta^{1/2} \quad (23)$$

To reduce Moire errors for the entire input image, one can move it sufficiently far off axis so that there is negligible overlap with the circle defined by $r = \zeta^{1/2} R$. Equivalently, one can move Fresnel zone transparencies 22 and 24 sufficiently far off axis. Thus, there are upper and lower bounds on the choice of $n_Z$; however, arbitrarily small diffraction errors can be achieved without violating the inequality (23) by increasing $R^2/\lambda t$ as much as is practical.

As an example of the use of the present invention, the following parameters may be chosen for illustrative purposes: $n_Z = 250$, $n_I = 50$, $R = 5$ cm, $t = 10$ cm, $a = 2$ cm, $b = 4$ cm, and $\lambda = 5 \times 10^{-5}$ cm, which is a typical wavelength of visible light. If the radius of the output plane $= R$, then, from equation (21), $\eta = 0.03$ and $\zeta = 0.01$ where $\eta$ is the ratio of the diffraction blurring distance to the radius R and $\zeta$ is the fraction of area in the output plane outside of which the error associated with $R(\underline{r},\underline{k})$ is negligible. Also, from the above, $f_Z = 4000$ cm.

A further understanding of the present invention may be obtained by an analysis of the Moire effect produced by a pair of Fresnel zone patterns to supplement the foregoing mathematical analysis of the optical phenomena.

The scale of a Fresnel zone plate is uniquely defined by the diameter of its center spot, whether light or dark. In the following discussion, the diameter Z of the center spot is generally defined as $$2\sqrt{\left[\left(n_{min} + \frac{1}{2}\right)\pi - \Psi\right]/\gamma},$$

where $\psi$ is defined by Equation (18a). A first center spot of diameter Z ($Z \cdot \sqrt{n}$ is surrounded by a second ring of diameter $Z \cdot \sqrt{2}$ which in turn is surrounded by a third ring of diameter $Z \cdot \sqrt{3}$ and so on, a typical ring being expressed as $Z \cdot \sqrt{n}$ as stated above. This specific case corresponds to $\psi = -\pi/2$ shown in Equation (18a). For convenience, zone plates with center spot diameters of between 2 and 20 mm are most useful. The outer rings on zone plates with center spots smaller than 2 mm. become very closely spaced and lose their shadowing power by light diffraction. Zone plates with center spots larger than 20 mm. are applicable only to large transformers using very coarse target patterns.

The number of rings on a zone plate has no effect on the performance of the transformer. Additional rings only increase the aperture size and permit the more efficient transformation of larger patterns. Since the spacing and width of the rings become smaller toward the periphery of the plate, a limit on plate size is imposed by diffraction. Thus, to assure satisfactory performance, zone plates used in cosine transformer applications must be fabricated with accuracy and precision.

Figure 7:
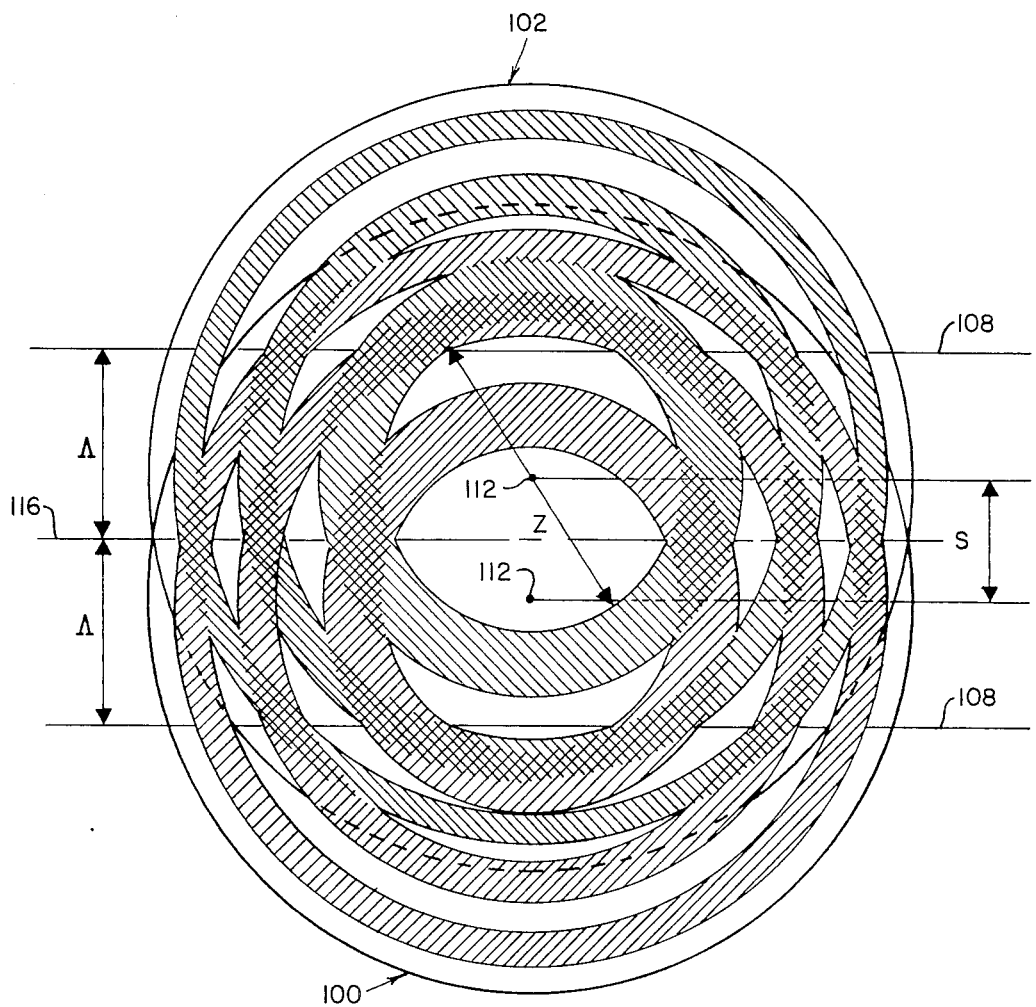
FIG. 7 is a plan view depicting a portion of pair of displaced Fresnel zone patterns of identical polarity.
Figure 8:
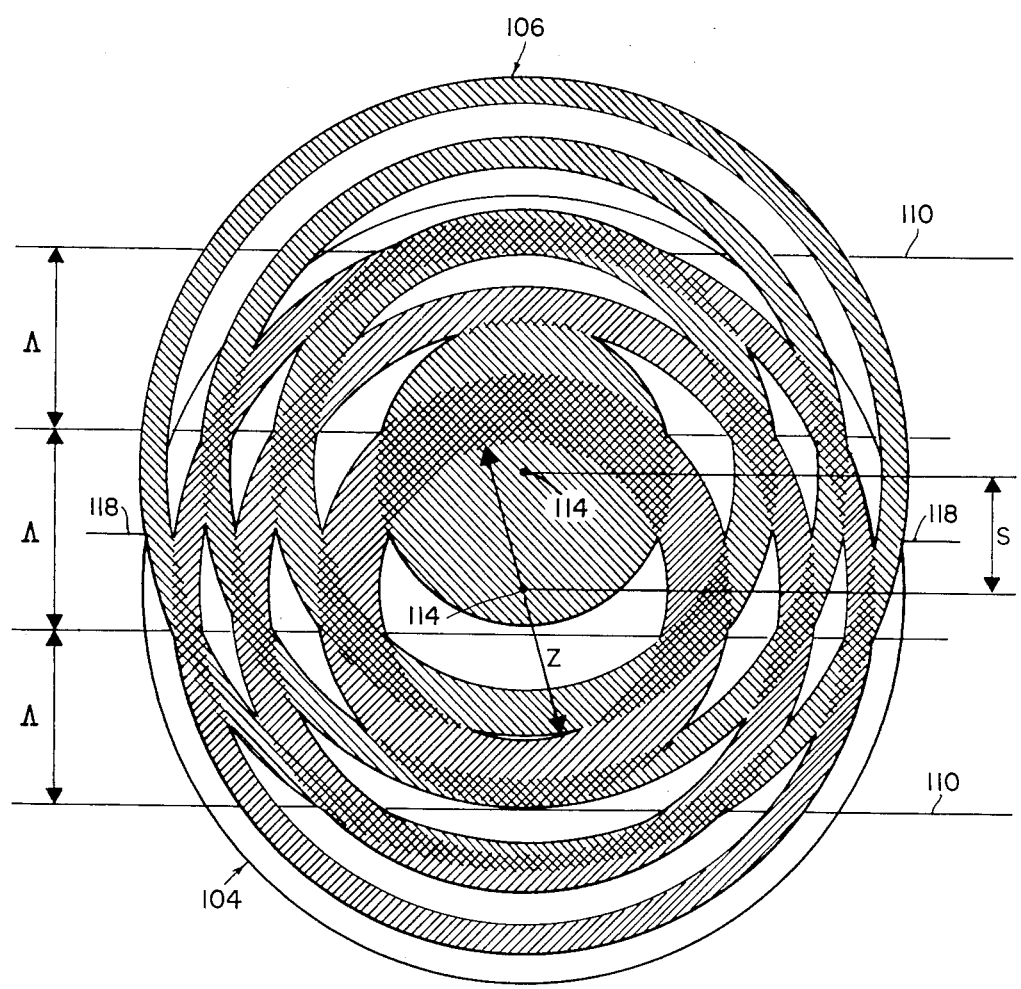
FIG. 8 is a plan view depicting a portion of a pair of displaced Fresnel zone patterns of opposing polarity.

With reference to FIGS. 7 and 8, superimposed zone plates 100, 102 and 104, 106 form a Moire pattern of parallel lines, indicated by representative lines 108 and 110. A small displacement S between zone plate centers 112 and 114 generates a Moire pattern of widely spaced parallel lines. The relationship between displacement and line spacing is mathematically expressed as $$S\Lambda = Q_Z \quad (24)$$

where $Q_Z$ = Constant for a particular pair of identical zone plates and $\Lambda$ = Wavelength of a Moire line pattern or target line pattern and equals $2\pi/|\underline{k}|$.

It can be shown that $$Q_Z = \frac{1}{4}Z^2 \quad (25)$$

where

Z = Zone plate scale factor (diameter of center spot in mm.)

By substitution from Equation (24), the following expression is obtained $$\Lambda = \frac{1}{4} Z^2/S \quad (26)$$

Just as two superimposed zone plates form a moire pattern of parallel lines, so does a parallel line pattern superimposed on a zone plate form a Moire pattern of two symmetrically displaced zone plates of identical scale factor. The displacement of these Moire zone plates is given by $$S = \frac{1}{4}Z^2/\Lambda \quad (27)$$

The "polarity" of the zone plates, i.e., the opacity or transparency of the center spot, affects the polarity of the generated line pattern. Two plates of identical polarity will project dark lines on light background, while a plate pair of opposing polarity will project light lines on a dark background, as respectively demonstrated by FIG. 7 and FIG. 8. The axis of symmetry 116 between two zone patterns 120 and 122 in FIG. 7 passes through the light area of the Moire line pattern. In FIG. 8, on the other hand, this axis 118 passes through the dark area of the Moire line pattern. Alternatively stated, zone plate pairs of opposing polarity generate a spatial frequency which is 180° out of phase when compared with identical plate pairs of equal polarity.

Figure 9:
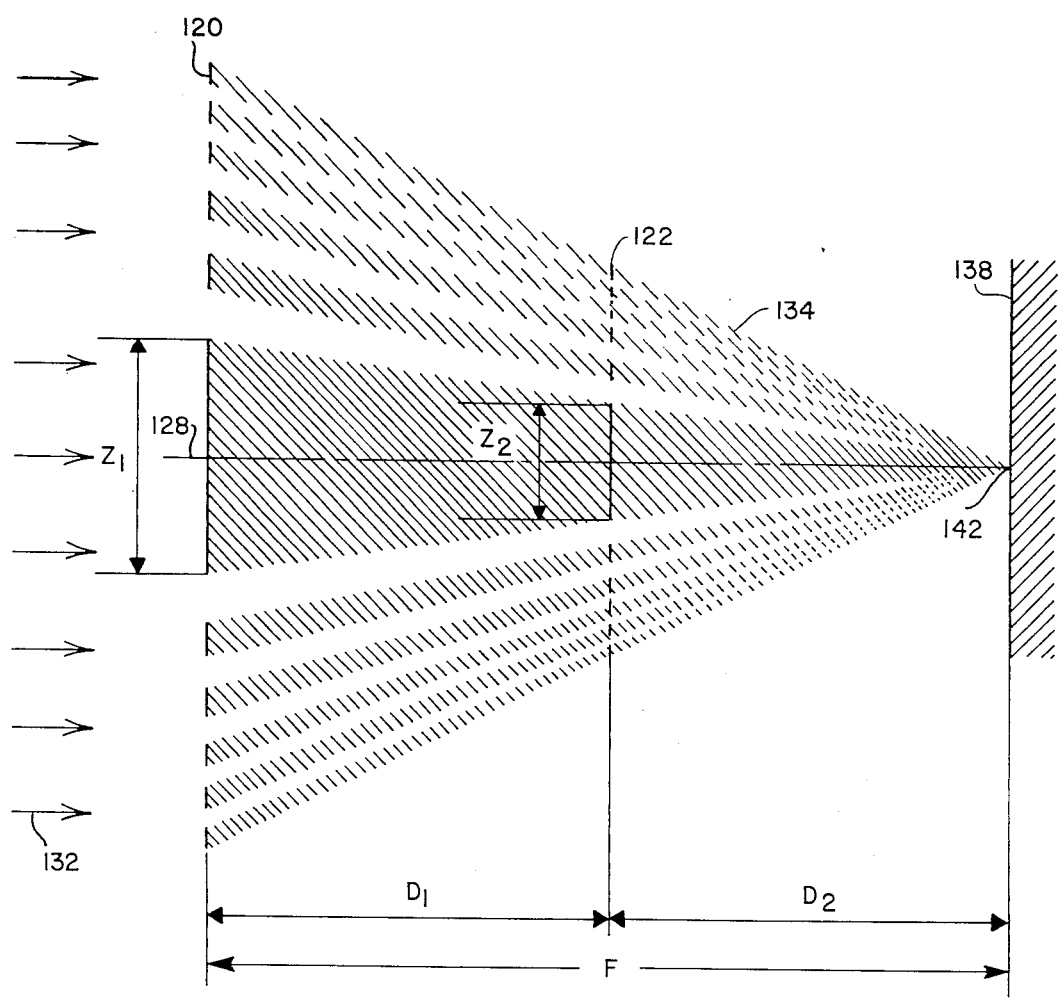
FIGS. 9 and 10 are side views illustrating a pair of differently scaled Fresnel zone patterns to illustrate the zone pattern shadows converging at the pseudo-focal length on a transforms plane without the use of a converging lens, FIG. 9 showing patterns of identical polarity and FIG. 10 showing patterns of opposing polarity.
Figure 10:
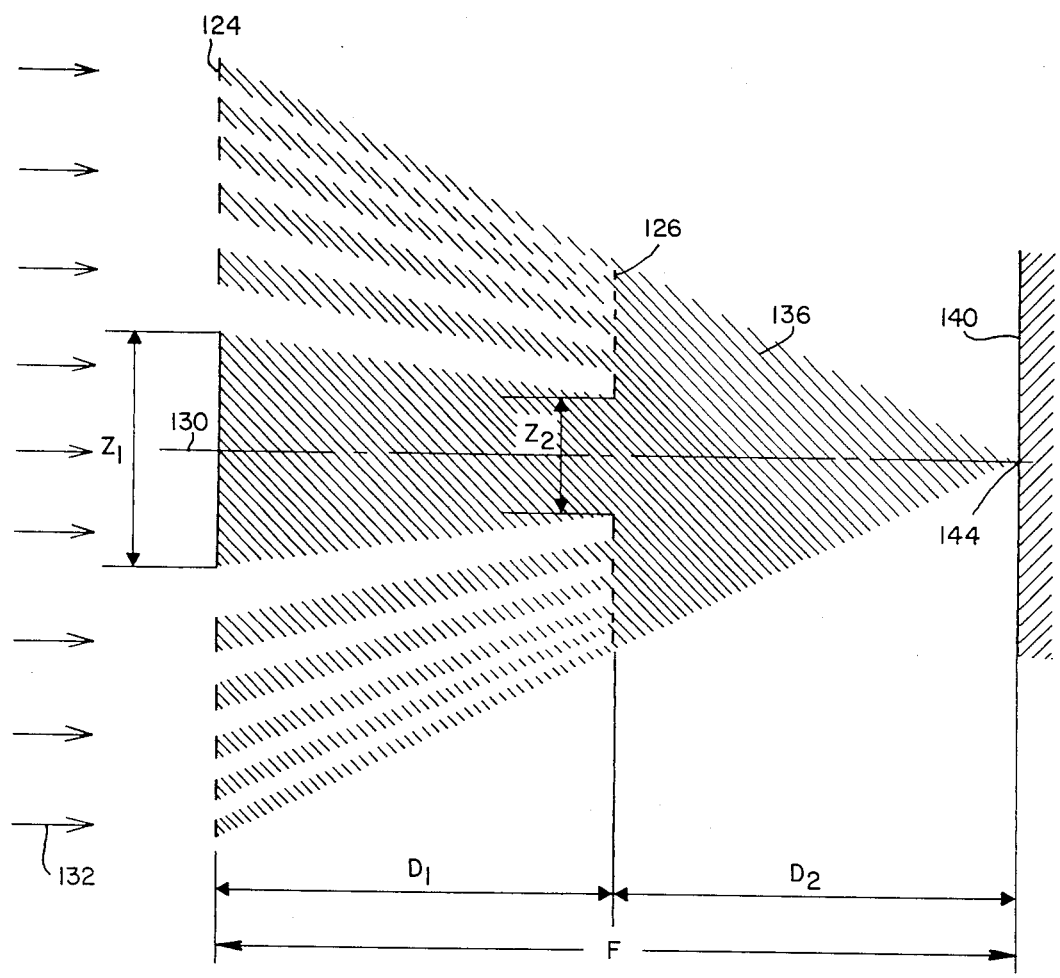

The simplest transformer employs no lenses, as shown in FIGS. 9 and 10. Two separated zone plate transparencies 120 and 122 (FIG. 9) and 124 and 126 (FIG. 10) of different scale factor are aligned on a common optical axis 128 and 130. They are transilluminated along the axis from the larger plate side by a diffuse area light source 132.

Figure 11:
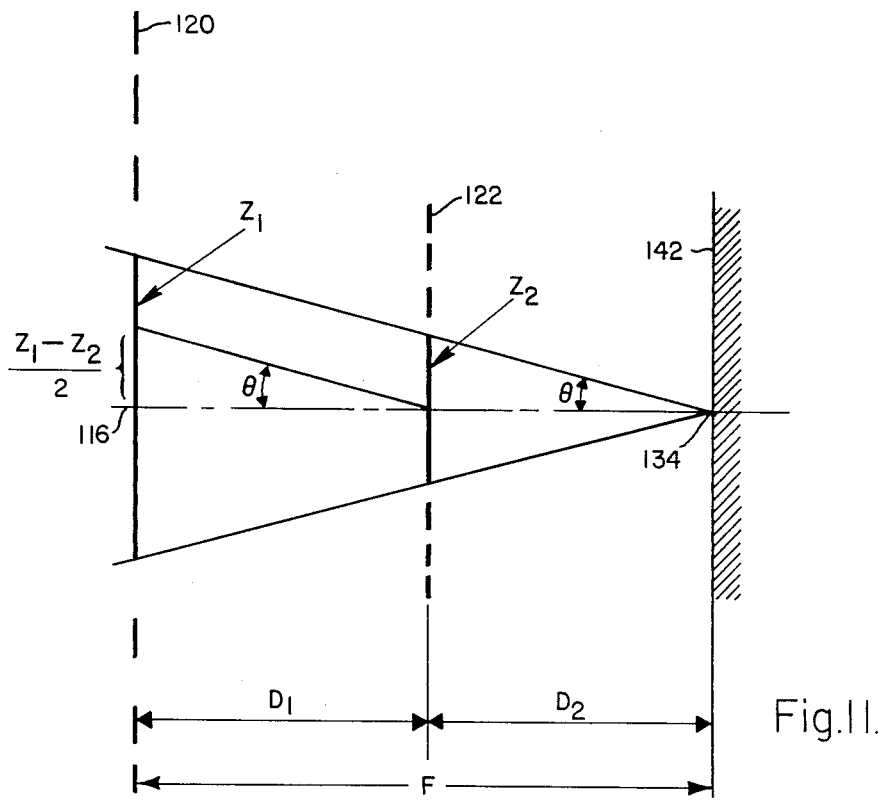
FIG. 11 illustrates a pair of Fresnel zone plates of identical polarity useful as an aid in the description of the optical phenomena of the present invention.

In such an apparatus, the zone plate shadows 134 and 136 converge at a fixed distance, referred to as the pseudo-focal length F, on the optical axis (see FIGS. 9 and 10) at the transform planes 138 and 140. Plates of equal polarity (FIG. 9) will form a light "focal spot" 142 while plates of opposing polarity will form a dark focal spot 144 (FIG. 10). A plane orthogonal to the optical axis and at the distance of the pseudo-focal length becomes the transform plane. As shown in FIG. 11, representing the configuration of FIG. 9, for example, the dimensions of such an array are interrelated by $$D_2 = D_1 Z_2/(Z_1 - Z_2) \quad (28)$$

where
- $D_1$ = Distance between the zone plates
- $D_2$ = Distance between second zone plate and transform plane
- $z_1$ = Scale factor of first (larger) zone plate
- $z_2$ = Scale factor of second (smaller) zone plate.

The pseudo-focal length F of a zone plate pair is expressed by $$F = D_1 + D_2$$

of from Equation (28)

$$F = D_1 + D_1 (Z_2/Z_1 - Z_2) \quad (29)$$

and is proportional to the distance between the zone plates and inversely proportional to the difference in scale between the two zone plates.

$$2D_1/(Z_1 - Z_2) = \cot \theta \quad (30)$$

expresses the angle of convergence of the shadow cone where $\alpha$ is the half-angle of the cone. Just like the pseudo-focal length, this angle is determined by the scale factor of the two zone plates and the spacing between them. Experimental verification with different zone plates and spacings are shown in Table 1:

TABLE 1.

All dimensions in mm.

| $Z_1$ | $Z_2$ | $D_1$ | $D_2$ | $F$ | $\cot \theta$ | $2\theta$ |
|---|---|---|---|---|---|---|
| 9.90 | 7.62 | 100 | 334 | 434 | 21.74 | 5° 16' |
| 9.90 | 7.62 | 90 | 300 | 391 | 19.56 | 5° 52' |
| 9.90 | 7.62 | 80 | 267 | 347 | 17.39 | 6° 34' |
| 9.90 | 7.62 | 70 | 234 | 304 | 15.22 | 7° 32' |
| 9.90 | 7.62 | 60 | 201 | 261 | 13.04 | 8° 46' |
| 7.62 | 5.03 | 51.5 | 100 | 152 | 9.94 | 11° 22' |
| 9.90 | 7.62 | 30 | 100 | 130 | 6.52 | 17° 26' |
| 7.62 | 5.03 | 30 | 58 | 88 | 5.79 | 19° 34' |
| 11.18 | 7.62 | 30 | 64 | 94 | 4.21 | 26° 42' |
| 11.18 | 3.96 | 59 | 32 | 91 | 4.09 | 27° 28' |
| 9.90 | 5.03 | 10 | 11 | 61 | 1.08 | 35° 58' |
| 11.18 | 3.96 | 31 | 16 | 47 | 2.15 | 49° 52' |

Figure 12:
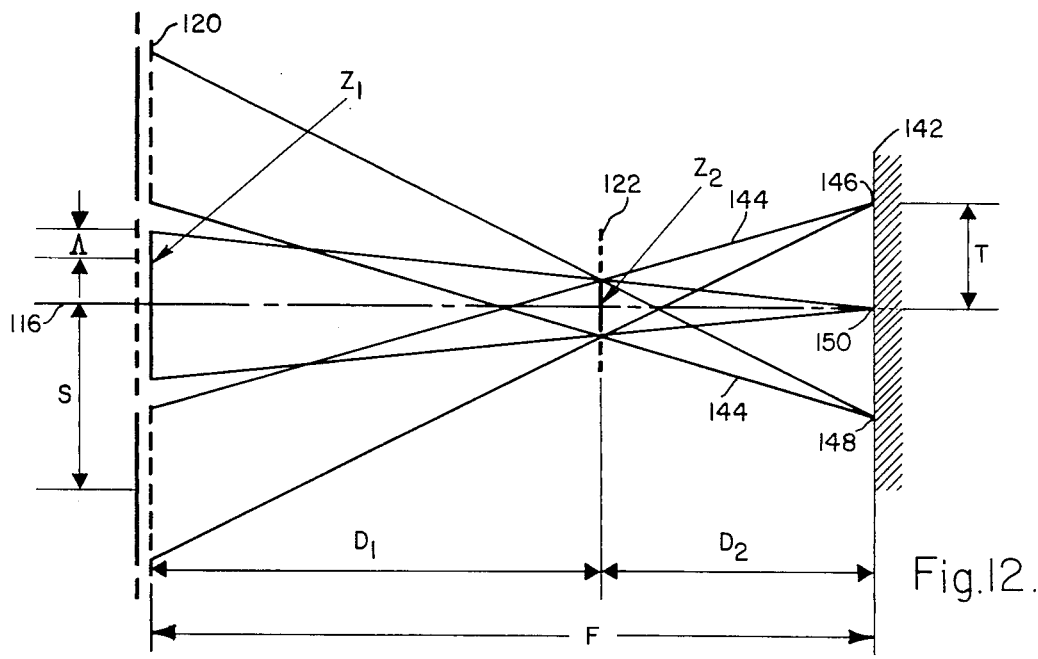
FIG. 12 is similar to the illustration of FIG. 11 with an input image added thereto as a further aid in the description of the present invention.

Referring to FIG. 12, by superimposing a parallel line pattern code or target on first zone plate 120, two new "Moire zone plates" are formed. These Moire plates form two displaced shadow cones 144 which converge at spots 146 and 148 on transform plane 142. The lateral distance of these spots from center point 150 at the intersection of plane 142 and axis 116 of the array is proportional to the spatial frequency of the line pattern generating them. A higher spatial frequency of the line pattern causes a larger displacement of the Moire zone plates which in turn causes a larger displacement of the shadow cones or transform spots.

If $\Lambda$ is the wavelength of the parallel line code or target pattern placed in contact with the front (larger) zone plate, then, with the aid of FIG. 12, $$T = S(D_2/D_1), \quad (31)$$

where
- T = lateral spacing between the transform spot and axis, where T is the scaler of the vector $r_D$.

Thus, by substitution from Equations (27) and (28), $$T = 1/\Lambda \, (Z_1^2 \, Z_2/4 \, (Z_1 - Z_2)) \quad (32)$$

or, since the spatial frequency of the line pattern is $$k/2\pi = 1/\Lambda, \quad (33)$$

the lateral spacing can be expressed as $$T = k/2\pi \left( \frac{Z_1 Z_2}{4\left(1 - \frac{Z_2}{Z_1}\right)} \right) \quad (34)$$

or $$T = k/2\pi \cdot Q_T$$

where
- $k/2\pi$ = Spatial frequency of target pattern $$Q_T = \frac{Z_1 Z_2}{4\left(1 - \frac{Z_2}{Z_1}\right)} \quad (35)$$

is the transform constant for $Z_1 > Z_2$.

This constant is independent of the spacing $D_1$ between the zone plates as experimentally verified and shown by Table 2. It can be shown that in the general case $Q_T = (\pi \cdot t)/(b-a)$.

TABLE 2.

| $Z_1$ | $Z_2$ | $D_1$ | $D_2$ | $D_3$ | $F$ | $\cot \theta$ | $2\theta$ | $\Lambda$ | $k/2\pi$ | $T$ | $Q_T$ |
|---|---|---|---|---|---|---|---|---|---|---|---|
| 9.90 | 7.62 | 100 | 334 | 0 | 434 | 21.74 | 5°16' | 10.6 | .09 | 7.5 | 83 |
| | | | | | | | | 5.4 | .18 | 15 | 83 |
| | | | | | | | | 3.7 | .26 | 22 | 83 |
| | | | | | | | | 3.2 | .31 | 26 | 83 |
| | | | | | | | | 1.6 | .63 | 52 | 83 |
| 9.90 | 7.62 | 29 | 106 | 0 | 135 | 6.36 | 17°52' | 10.6 | .09 | 7.5 | 83 |
| | | | | | | | | 5.4 | .18 | 15 | 83 |
| | | | | | | | | 3.7 | .26 | 22 | 83 |
| | | | | | | | | 3.2 | .31 | 26 | 83 |
| | | | | | | | | 1.6 | .63 | 52 | 83 |

Here, the same zone plate pair was used at two different spacings (100 and 29 mm.) but had the same transform constant of 83. Exchanging the first zone plate with a coarser one and the second with a finer one, new values for $Q_T$ are obtained as

TABLE 3

| $Z_1$ | $Z_2$ | $D_1$ | $D_2$ | $D_3$ | $F$ | $\cot\theta$ | $2\theta$ | $\Lambda$ | $k/2\pi$ | $T$ | $Q_t$ |
|---|---|---|---|---|---|---|---|---|---|---|---|
| 11.18 | 7.62 | 100 | 205 | 0 | 305 | 14.04 | 8° 8' | 10.6 | .09 | 6 | 67 |
|  |  |  |  |  |  |  |  | 5.4 | .18 | 12 | 67 |
|  |  |  |  |  |  |  |  | 3.7 | .27 | 18 | 67 |
|  |  |  |  |  |  |  |  | 3.2 | .31 | 21 | 67 |
|  |  |  |  |  |  |  |  | 1.6 | .62 | 42 | 67 |
| 11.18 | 3.96 | 59 | 34 | 0 | 83 | 4.08 | 27° 32' | 10.6 | .09 | 1.5 | 17 |
|  |  |  |  |  |  |  |  | 5.4 | .18 | 3.1 | 17 |
|  |  |  |  |  |  |  |  | 3.2 | .31 | 5.3 | 17 |
|  |  |  |  |  |  |  |  | 1.6 | .62 | 10.5 | 17 |

Figure 13:
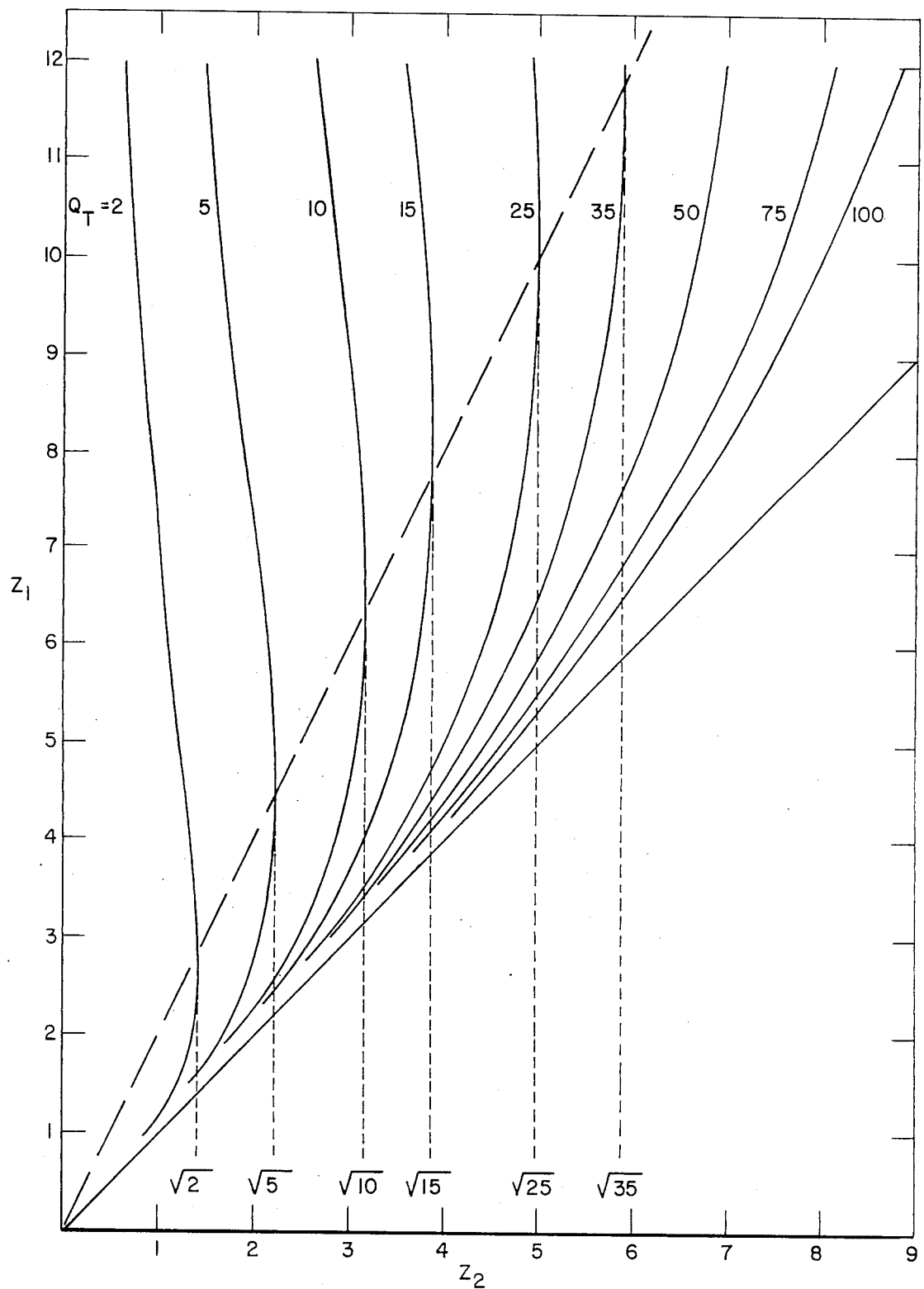
FIG. 13 is a plot of the several transform constants ($Q_T$) for a plurality of Fresnel zone patterns.

FIG. 13 is a plot of $Q_T$ as a function of different zone plate pairs. It shows that the transform constant goes to infinity when the two zone plates have equal scale factors. By differentiation and from this table, it can also be shown that $Q_T$ is minimum when $$Z_1 = 2Z_2 \quad (36)$$

and $$Q_T = Z^2{}_2 \quad (37)$$

Moving the transparent bar pattern target along the axis of the transformer has the same effect as changing the spatial frequency of the bar pattern. Or alternately, the virtual zone plate which is projected into the plane of the bar pattern is scaled up or down, proportional to the distances $D_3$.

Figure 14:
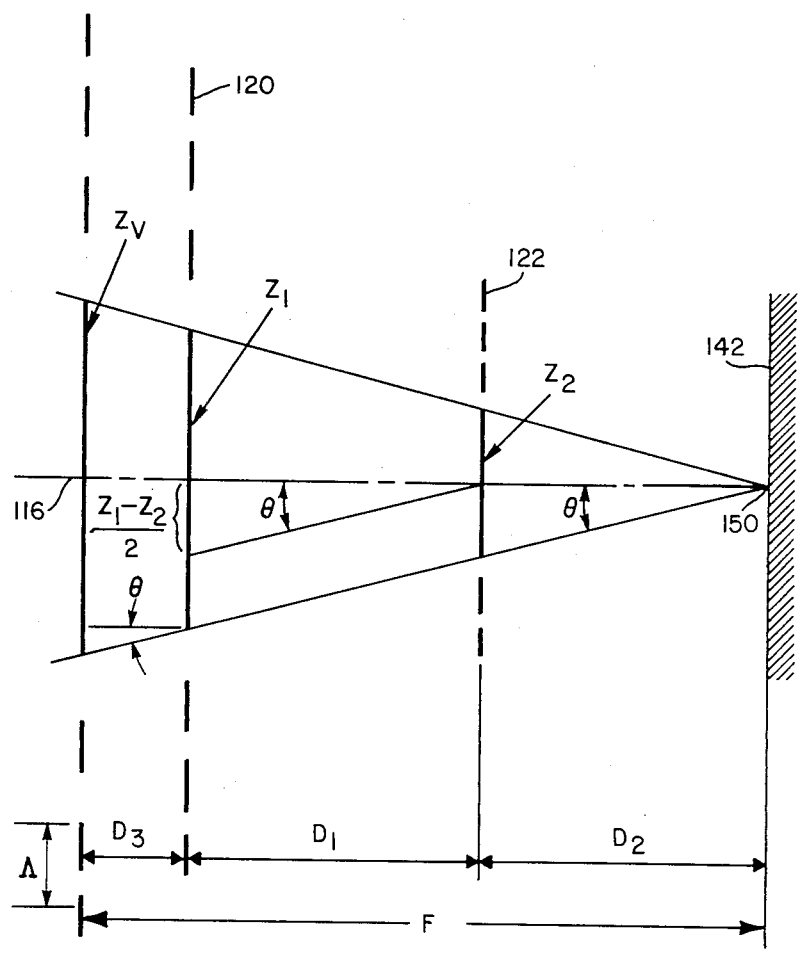
FIG. 14 is a view similar to that of FIG. 12 further useful in describing the present invention.

Referring to FIG. 14, $$\frac{Z_V}{2(D_1+D_2+D_3)} = \frac{Z_1}{2(D_1+D_2)}$$

$$Z_V = Z_1\left(\frac{(D_1+D_2+D_3)}{(D_1+D_2)}\right)$$

$$Z_V = Z_1\left(\frac{F+D_3}{F}\right) \quad (38)$$

$Z_V$ = scale factor of virtual zone plate in plane of target bar pattern.

By substituting $Z_V$ for $Z_1$ in Equation (35), a new $Q_T$ is obtained for the transformer:

$$Q_{TV} = k_T\left(\frac{Z_V Z_2}{4\left(1-\frac{Z_2}{Z_V}\right)}\right) \quad (39)$$

or from Equation (38).

$$Q_{TV} = \frac{Z_1 Z_2 (F+D_3)}{4F\left(1-\frac{Z_2 F}{Z_1(F+D_3)}\right)} \text{ for } D_3 > -F \quad (40)$$

where $Q_{TV}$ = Transform constant for virtual zone plate, or real target pattern, at distance $D_3$ from $Z_1$.

Referring to FIG. 14 and Equations (36) and (37), $Q_{TV}$ is minimum when $$Z_V = 2Z_2 = 2\sqrt{Q_T}$$

or $$D_1 + D_3 = D_2$$

or $$F = 2D_2.$$

Experimental data of Table 4 show the effects of moving a bar pattern of fixed spatial frequency along the axis of the transformer. It proves that the virtual spatial frequency displayed by the transform spots increases with distance from the transform lane and is valid even when the target bar pattern is placed inside the transformer ($D_3$ is negative). This table also shows that the minimum transform constant is at the distance $2D_2$ where $Q_T$ becomes $Z^2{}_2$.

| $Z_1$ | $Z_2$ | $D_1$ | $D_2$ | $F$ | $\cot\theta$ | $2\theta$ | $D_3$ | $\Lambda$ | $T$ | $Q_T$ | $k_V/2\pi$ |
|---|---|---|---|---|---|---|---|---|---|---|---|
| 9.90 | 7.62 | 100 | 334 | 434.74 | 5°16' | | −50 | .18 | 14 | 128 | .11 |
|  |  |  |  |  |  |  | 0 | .18 | 15 | 83 | .18 |
|  |  |  |  |  |  |  | +50 | .18 | 16 | 68 | .23 |
|  |  |  |  |  |  |  | 100 | .18 | 18.5 | 62 | .30 |
|  |  |  |  |  |  |  | 200 | .18 | 22 | 58.2 | .38 |
|  |  |  |  |  |  |  | 234 |  |  | 58.06 min. $Q_T$ |  |
|  |  |  |  |  |  |  | 300 | .18 | 25.5 | 58.5 | .44 |
| 11.18 | 7.62 | 100 | 205 | 305.04 | 8°8' | | −50 | .18 | 10.5 | 96 | .11 |
|  |  |  |  |  |  |  | 0 | .18 | 12.0 | 67 | .18 |
|  |  |  |  |  |  |  | +50 | .18 | 13.0 | 60 | .22 |
|  |  |  |  |  |  |  | 100 | .18 | 16.5 | 58.1 | .28 |
|  |  |  |  |  |  |  | 105 |  |  | 58.06 min. $Q_T$ |  |
|  |  |  |  |  |  |  | 200 | .18 | 20.0 | 60 | .33 |
|  |  |  |  |  |  |  | 300 | .18 | 24.0 | 64 | .375 |

TABLE 4.

Equation (35) shows that identical zone plates will have an infinite $Q_T$. Such a combination will, therefore, be unable to transform patterns. Inclusion of a positive lens in the transformer array, as shown schematically in FIG. 15, produces convergence of the ray bundles and image transformation.

Geometric optics state that two equal zone plates 152 ($Z_{0e}$) and 154 ($Z_{01}$) located on the optical axis 156 of a positive lens 158 at a distance $Y_1$ and $Y_2$ will project two inverted real zone plate images 150 and 162 of different scale $Z_1$ and $Z_2$.

Looking toward the light source 164 from the focal spot 166, the observer will see two erect virtual images $Z_{1V}$ and $Z_{2V}$ of different scale. By placing the transform plane 168 at $f_1$, the images placed in front of the plane can be transformed.

Figure 15:
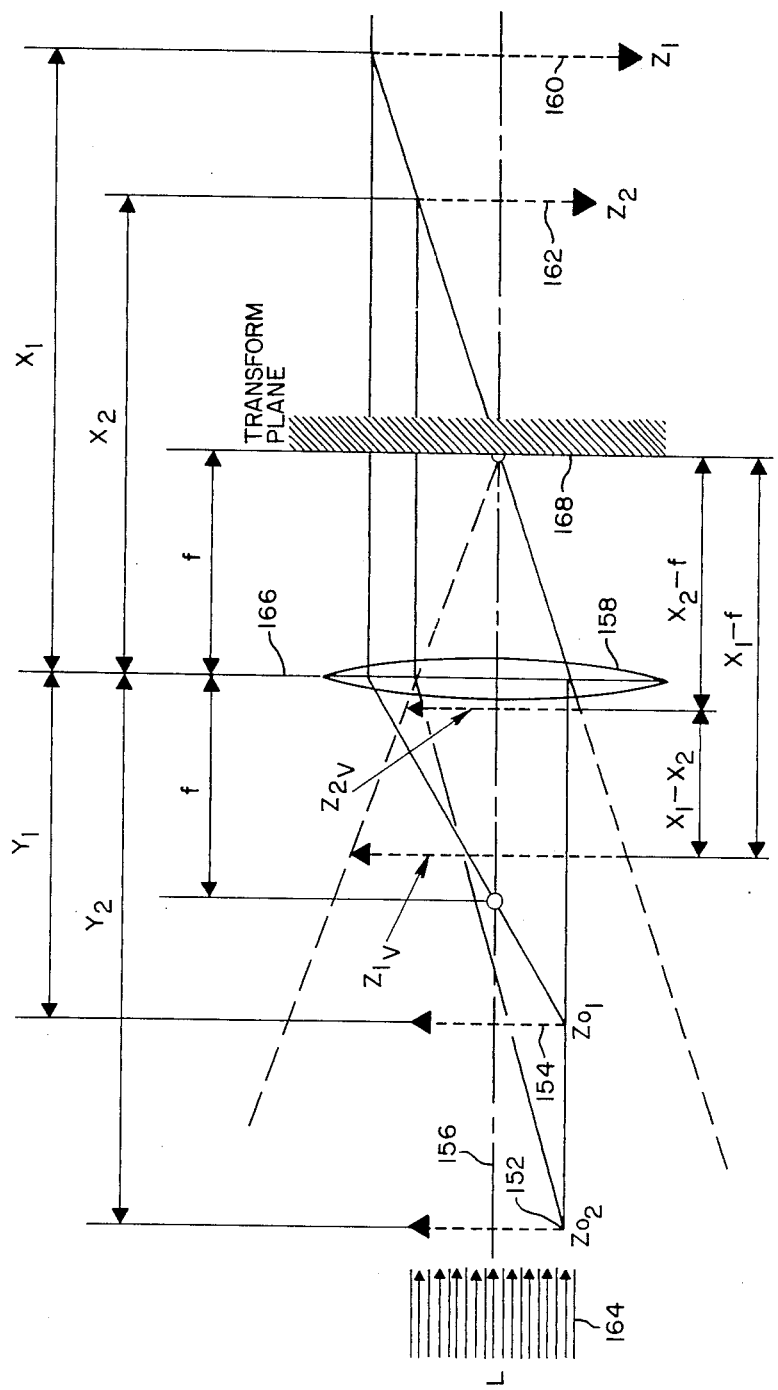
FIG. 15 is a view of a pair of identically scaled Fresnel zone patterns of identical polarity, an input image and a converging lens which is useful to aid in the description of the present invention.

Referring to FIG. 15, thin lens laws state $$\frac{1}{X_1} = \frac{1}{f} - \frac{1}{Y_1}$$

$$\frac{1}{X_2} = \frac{1}{f} - \frac{1}{Y_2}$$

and $$Z_1 \text{ (or } Z_{1V}) = \frac{Z_0}{(Y_1/f) - 1}$$

$$Z_2 \text{ (or } Z_{2V}) = \frac{Z_0}{(Y_2/f) - 1}$$

where $z_0$ = Scale factor of identical real zone plate objects
$Z_1$ = Scale factor of first (larger) projected real zone plate image
$Z_2$ = Scale factor of second (smaller) projected real zone plate image
$Z_{1V}$ = Scale factor of first (larger) virtual zone plate image
$Z_{2V}$ = Scale factor of second (smaller) virtual zone plate image
$Y_1, Y_2$ = Lens to object distances $X_1, X_2$ = Lens to image distances.
Also,
f = Focal length of lens
$D_1 = X_1 - X_2$
$D_2 = X_2 - F$
$F = X_1 - F$.

By selecting $Z_o, f, Y_1$ and $Y_2$, it is possible to form any desired virtual zone plate pair from two identical zone plates.

The transform constant of such an array is $$Q_T = Z^2_o/4_u \, v \, (1 - a/b) \qquad (41)$$

where $$u = Y_1/f - 1$$

$$v = Y_2/f - 1.$$

Contrary to Equation (35) this configuration is sensitive to the individual zone plate location.

If the spacing between the identical zone plates is kept fixed, then the transform constant remains fixed regardless of the distance of the plate from the lens. Under these conditions, $Z_{1V}$ and $Z_{2V}$ are scaled up or down by the identical magnification ratio, and the ray bundles of the virtual zone plate images converge at the (constant) focal-transform plane of the lens.

Pattern targets introduced anywhere on the object side of the lens will have a fixed $Q_T$, while those inserted between the lens and the transform plane will be transformed with a $Q_T$ which goes to zero as the pattern approaches the transform plane. Table 5 shows experimental verification data.

| $Z_o$ | $Y_2$ | $f$ | $\Lambda$ | $k/2\pi$ | lens to Target | $Y_2-Y_1$ | $T$ | $Q_T$ |
|---|---|---|---|---|---|---|---|---|
| 9.90 | 230 | 214 | 3.1 | .315 | 650 | 165 | 10 | 32 |
| 9.90 | 230 | 214 | 3.1 | .315 | 270 | 165 | 10 | 32 |
| 9.90 | 700 | 214 | 3.1 | .315 | 965 | 165 | 10 | 32 |
| 9.90 | 700 | 214 | 5.4 | .186 | 965 | 165 | 6 | 32 |
| 9.90 | 700 | 214 | 5.4 | .186 | 50 | 165 | 6 | 32 |
| 9.90 | 100 | 214 | 5.4 | .186 | 50 | 67 | 15 | 81 |
| 9.90 | 100 | 214 | 5.4 | .186 | 200 | 67 | 15 | 81 |
| 9.90 | 100 | 214 | 5.4 | .186 | 400 | 67 | 15 | 81 |
| 9.90 | 160 | 214 | 5.4 | .186 | 350 | 128 | 7.5 | 40 |
| 9.90 | 250 | 214 | 5.4 | .186 | 350 | 196 | 5 | 27 |
| 9.90 | 250 | 214 | 3.1 | .315 | 350 | 196 | 8.5 | 27 |

TABLE 5.

It is possible to combine the lensless and the focusing transformer by placing a telescope lens in front of a transformer with two different zone plates. Alternately, the lens can be located between the different zone plates to obtain telescopic magnification.

These alternate configurations permit close spacing of the optical elements of lens, zone plates and transform plane but are very sensitive to minor optical aberrations in the elements.

In all transformer applications the target pattern can contain many superimposed spatial frequencies at different orientations. Only target opacity and Moire interference limit the number of allowable superimpositions. In all configurations the target pattern can be emissive (in the form of patterned light sources) or reflective (in the form of patterned reflectors) in addition to the transparencies described here. In these cases, the code or target pattern must be placed on the side of both zone plates opposite the transform plane.

Figure 16:
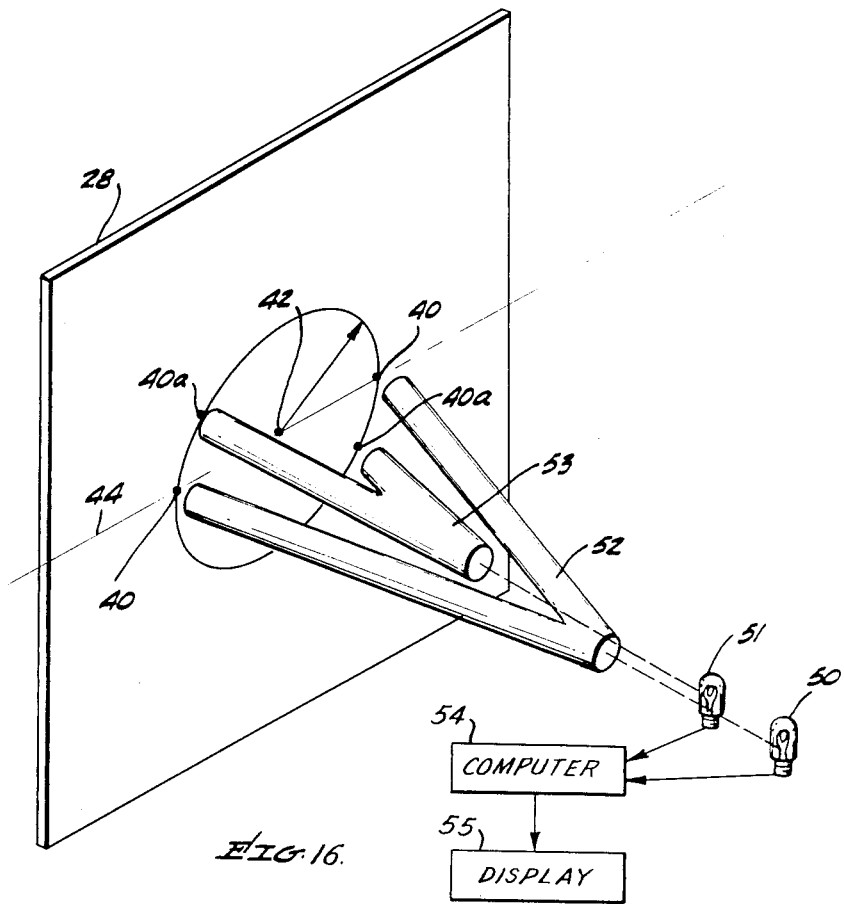
FIG. 16 is a schematic diagram illustrating an exemplary detector and output signal processing arrangement for reading output signals.

Referring now to FIG. 16 the actual reading of the codes is accomplished at transform or output plane 28 by a suitable detector arrangement which may include, for example, a photodetector 50 and a paired light pipe or fiber optics device 52 having one pair end adjacent each of conjugate loci 40 and the other single end suitably oriented near photodetector 50. Any of the conventional types of photodetectors that are well known in the prior art may be used for photodetector 50. Additional detector arrangements such as the combination of a photodetector 51 and paired fiber optics device 53 may be employed to detect the presence of conjugate loci 40a corresponding to the Fourier transforms input images having a different orientation. As many detections and paired light pipe devices are employed as there are bar patterns forming the conjugate loci. Information from detectors 50 and 51, as well as any others required to be used, are fed into a computer 54 or other data recording device for processing and storage therein. A display or other information retrieval apparatus 55 is connected to the computer so that the information may be utilized such as for inventory accounting sheets or simple display.

It should be noted that output plane 28 may be simply an imaginary plane in space that is oriented as previously described. If a tangible element is used, however, it may be either opaque or transparent. An opaque output plane 28 could, for example, be equipped with apertures at the anticipated locations of the conjugate loci to accommodate the above described detector arrangements.

Because imaginary straight line 44 joining conjugate loci 40, for example, will always be orthogonal to bars 12 and 14 of a graphic multiple parallel bar pattern, a coding arrangement may be provided by placing several bar patterns in fixed angularly oriented increments. For example, as illustrated in FIG. 17, using 15° increments, the ten digits required in a numeric decimal coding arrangement would cover 150° wherein each bidirectional arrow represents collectively the orientation of each graphic multiple parallel bar pattern corresponding to each of the respective ten digits. Any other suitable scheme could be employed to accommodate the required number of digits.

FIG. 18 illustrates the orientations of the several conjugate loci forming the transform images as they would appear in output plane 28 (FIG. 1), relative to each of the respective bar pattern orientations represented by the bidirectional arrows in FIG. 17. For example, the imaginary straight line 58 (FIG. 18) that would join the conjugate loci corresponding to the digit "4" is perpendicular to the orientation of the bar pattern for the digit "4" as represented by bidirectional arrow 56 (FIG. 17). The radial distance indicated by the arrow 60, which is the spacing between each of the loci and center 42, is directly proportional to the fundamental spatial frequency of the graphic multiple parallel bar pattern as previously mentioned.

In labeling the moving objects, a plurality of markers 10 may be arranged vertically as a column on an object as illustrated by FIG. 19. For purposes of illustration, each marker is oriented according to the scheme set forth with respect to FIG. 17 to indicate the marker orientations representing numerals "1" through "0." A plurality of optical readers collectively designated by indicium 70 can then be employed to read respective markers 10 in parallel, with one reader per marker, as the moving object passes the appropriately situated optical readers.

As an alternative, labeling method, markers 10 may be arranged in a horizontal row on an object as illustrated in FIG. 20. Again, solely for illustrative purposes, each marker has an orientation different from its adjacent marker in accordance with the FIG. 17 scheme to represent numerals "1" through "0." This arrangement allows the respective markers to be read serially as the object passes a single optical reader. A symmetrical or bidirectional coding scheme may be used for serial reading to make the system insensitive to the direction of motion.

As a further modification depicted in FIGS. 21–24, a single marker can be made to accommodate a plurality of digits with an arrangement of concentric rings each having a different graphic bar pattern whose orientation is determined in accordance with a coding scheme such as illustrated in FIGS. 17 and 18.

Figure 21:
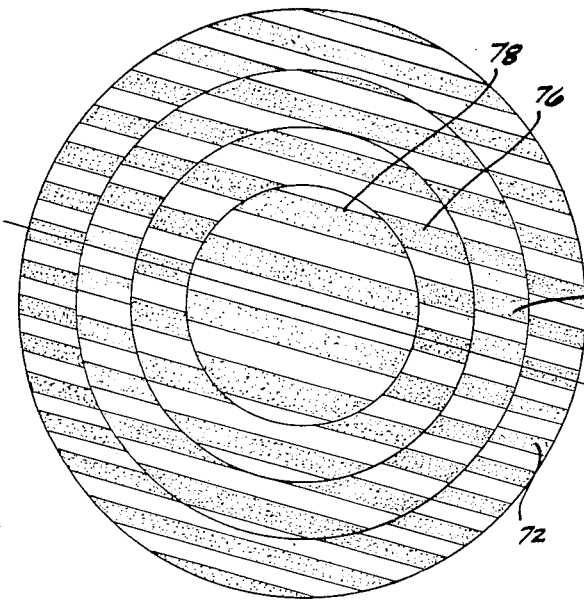
FIG. 21 illustrates a marker having a plurality of concentrically arranged graphic bar patterns for forming a specific composite grouping of input images.
Figure 22:
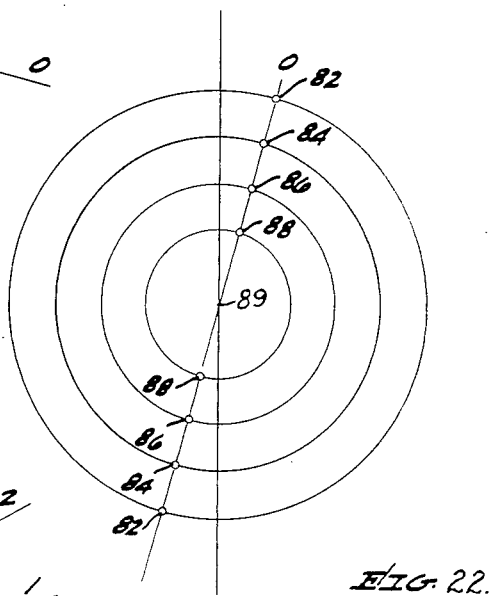
FIG. 22 is a representation of the composite of the output transform signals of the input image grouping formed by the patterns on the marker shown in FIG. 21.

In the illustrative arrangement of FIG. 21, four rings 72, 74, 76 and 78 of decreasing spatial frequency are selected to represent the four digit number "0000." The Fourier transform output signal shown in FIG. 22 includes conjugate loci 82, 84, 86 and 88 which respectively correspond to the input images formed from the graphic bar patterns of rings 72, 74, 76 and 78. Because the rings decrease sequentially in spatial frequency, the conjugate loci increase in distance from center 89.

Figure 23:
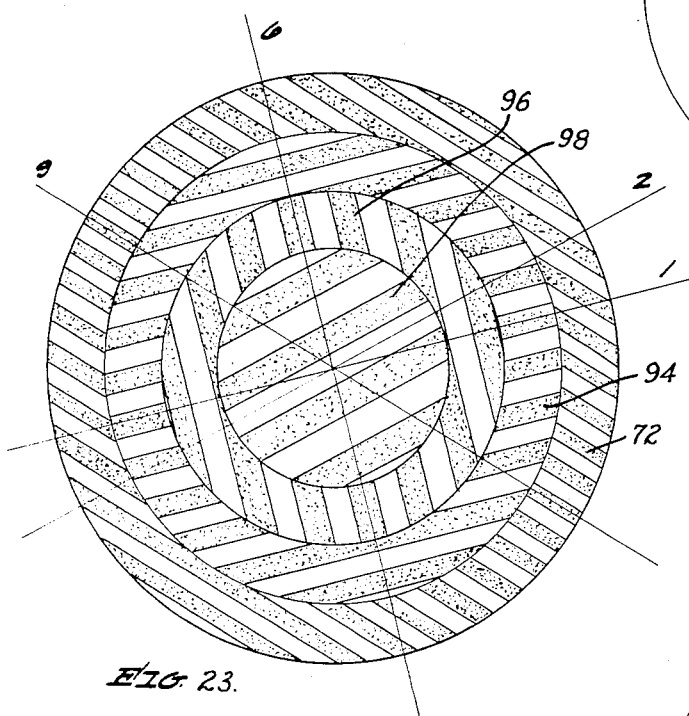
FIG. 23 illustrates a marker having a plurality of composite concentrically arranged graphic bar patterns arranged to represent a particular decimal number having four digits.
Figure 24:
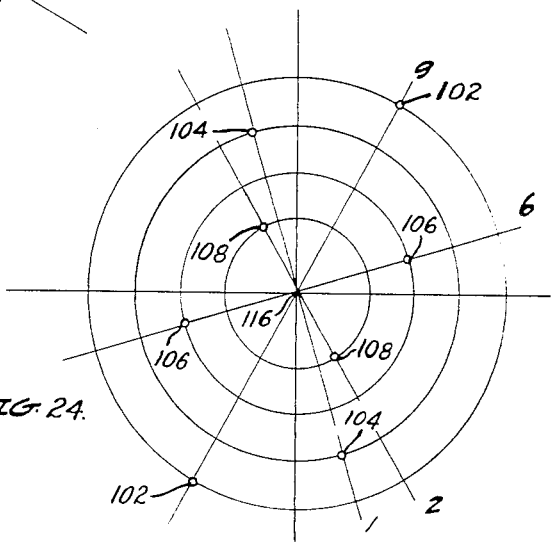
FIG. 24 is a representation of the composite of the output transform signals of the input images produced by the patterns on the marker shown in FIG. 23.

FIG. 23 illustrates an arrangement similar to that shown in FIG. 21 in which respective bar pattern rings 92, 94, 96 and 98 have been oriented to form the four digit number "9162." Like the rings of FIG. 21, rings 92, 94, 96 and 98 also decrease in spatial frequency. The corresponding transform signals of the input images obtained from patterns 92, 94, 96 and 98 are illustrated in FIG. 24 wherein the conjugate loci 102, 104, 106 and 108 again respectively relate to the graphic bar patterns in concentric rings 92, 94, 96 and 98 but with 90° orientation and increasing distance from origin 110.

For both examples depicted in FIGS. 21–24, an apparatus, such as that illustrated in FIG. 16, but with multiple paired light pipe devices and photodetectors corresponding to all rings in the output plane and all numbers in the rings, may be used to detect the particular codes for conversion into a numerical system. Information from the photodetectors may be fed into a computer and a display, or other information retrieval apparatus, to ascertain the information carried by the codes and the objects to which the coded patterns are affixed.

It is understood that while the foregoing discussion has been in connection with decimal numbers, it would be within the scope and spirit of the invention to apply the teachings included herein to accommodate other numeric systems or codes such as binary numbers as well as to accommodate alphabetic or alphanumeric words.

While preferred embodiments of the present invention have been described hereinabove, it is intended that all matter contained in the above description and shown in the accompanying drawings be interpreted as illustrative and not in a limiting sense and that all modifications, constructions and arrangements that fall within the scope and spirit of the present invention may be made.

What is claimed is:

1. An optical system for identifying moving and stationary objects in accordance with an identification system utilizing a plurality of separate codes designating individual and different identification information relating to the objects comprising:

input image means secured to the objects and having identification means depicting one or more of the separate codes for transmission of the information contained therein;

an extended source of spatially incoherent light for illuminating said input image means for providing a spatially incoherent light signal modulated in accordance with the information contained in said input image means;

transformer means in the path of the modulated light signal, including a pair of Fresnel zone patterns having a construction such that said patterns negligibly diffract the modulated light signal, for producing an output image which is the optical Fourier transform of said input image, said Fresnel zone patterns in combination being positioned so as to produce the optical Fourier transform of said input image as the modulated spatially incoherent light signal passes through said Fresnel zone patterns; and detector apparatus placed in the optical path of the output image for selectively detecting the output image and for obtaining the information contained therein.

2. An optical system defined by claim 1 wherein said identification means comprises a plurality of predetermined patterns of light reflective and non-reflective means corresponding to the separate codes.

3. An optical system defined by claim 2 wherein each of said predetermined patterns of light reflective and non-reflective means comprises a graphic multiple parallel bar pattern having a predetermined fundamental spatial frequency and orientation representing a selected one of the separate codes of the identification system.

4. An optical system as in claim 1 wherein said identification means comprises a plurality of bar patterns graphically representing a plurality of alpha-numeric symbols and having a distinct and different angular orientation for each represented alpha-numeric symbol, said plurality of bar patterns being arranged in a sequentially detected linear array.

5. An optical system as in claim 1 wherein said identification means comprises a plurality of bar patterns graphically representing a plurality of alpha-numeric symbols, said bar patterns having a distinct and different angular orientation for each represented alpha-numeric symbol, and having a distinct and different spatial frequency defining the sequential position of the symbols in a parallel simultaneously detected array of said bar patterns.

6. The optical system defined by claim 1 wherein said detector apparatus comprises a plurality of photo-electric detectors situated in close proximity to said output plane.

7. In an optical system for identifying moving and stationary objects having reflective markers arranged thereon in a predetermined manner representing identification information relating to the objects, an optical reader comprising:

means for illuminating said reflective markers to project spatially incoherent electromagnetic wave energy signal of said markers by reflection;

means in the path of the projected signals including a pair of adjacently placed Fresnel zone patterns through which the signal are projected, said Fresnel zone patterns having a construction so as to negligibly diffract the projected signals and being spaced from one another to develop output signals of the optical Fourier transforms of each of said reflective markers by optically transforming the projected signals as the projected signals pass through said Fresnel zone patterns; and means for detecting each of the output signals corresponding to the optical Fourier transforms to provide further signals representing the identify of the objects.

8. The apparatus defined by claim 7 wherein said reflective markers are provided with reflective and non-reflective areas arranged in a graphic multiple parallel bar pattern the fundamental spatial frequency and orientation of which are representative of a particular unit in a coding scheme identifying the objects.

9. An optical system for identifying moving and stationary objects comprising:

input image means secured to said objects and containing information identifying said objects;

an extended source of spatially incoherent light for illuminating said input image means for providing light signals of spatially incoherent light modulated in accordance with the information contained in said input image means;

transformer means including a pair of Fresnel zone patterns positioned in the path of the modulated, spatially incoherent light signals, said Fresnel zone patterns in combination being positioned so as to produce optical signals of the individual sine and cosine optical Fourier transforms of the input images upon passage of the modulated signals through said Fresnel zone patterns, said transformer means focusing the optical signals in an output plane and said Fresnel zone patterns having a focal length extending beyond the output plane at a distance sufficient to enable detection of the optical signals; and a detector apparatus positioned at the output plane for receiving and detecting the optical signals and for recognizing the information contained in said input image means.

10. An optical system as in claim 9 wherein said input image means comprises a plurality of bar patterns, each of said bar patterns comprising a plurality of light reflective and non-reflective bars in parallel orientation and of equal width, the orientation of each of said bar patterns having an angular inclination and the width of said bars of each of said bar patterns having a width dimension in accordance with a coding system conforming to the information identifying the objects, whereby the spatially incoherent light signals are modulated in accordance with the specific orientation and spatial frequency of said bar patterns, for transformation by said transformer means into the optical signals comprising conjugate loci in the output plane centered about the axis thereof at distances from and angular dispositions about the axis conforming to the input image configuration.

* * * * *

UNITED STATES PATENT OFFICE
CERTIFICATE OF CORRECTION

Patent No. 3,700,907    Dated October 24, 1972

Inventor(s) Jon H. Myer; Thomas R. O'Meara; John M. Richardson

It is certified that error appears in the above-identified patent and that said Letters Patent are hereby corrected as shown below:

IN THE SPECIFICATION:

Column 10, Equations 6 and 9 are incorrect. They should read as shown below:

$$\rho(\underline{r}_D) = \mu \int d^2 \underline{s} \rho(\underline{r}_{C'}) \; f(\underline{r}_{B'}) g(\underline{r}_{A'})$$

$$= \mu \int d^2 \underline{s} \rho \left( \underline{s} - \frac{c}{t} \underline{r}_D \right) \; f \left( \underline{s} - \frac{b}{t} \underline{r}_D \right) \; g \left( \underline{s} - \frac{a}{t} \underline{r}_D \right)$$

$$= \mu \int d^2 \underline{r} \rho(\underline{r}) \; f \left( \underline{r} + \frac{c-b}{t} \underline{r}_D \right) \; g \left( \underline{r} + \frac{c-a}{t} \underline{r}_D \right), \quad (6)$$

$$f \left( \underline{r} + \frac{c-b}{t} \underline{r}_D \right) \; g \left( \underline{r} + \frac{c-a}{t} \underline{r}_D \right)$$

$$= \alpha^2 + \frac{1}{2}\beta^2 \cos(\underline{k} \cdot \underline{r} + \delta) + R(\underline{r}, \underline{k}), \quad (9)$$

PO-1050
(5/69)

UNITED STATES PATENT OFFICE
CERTIFICATE OF CORRECTION

Patent No. 3,700,907      Dated October 24, 1972

Inventor(s) Jon H. Myer, Thomas R. O'Meara; John M. Richardson

It is certified that error appears in the above-identified patent and that said Letters Patent are hereby corrected as shown below:

PAGE - 2

IN THE CLAIMS:

Claim 7, Col. 23, lines 8 and 11:

"signal" should be "signals"

Claim 7, Col. 23, line 21:

"identify" should be "identity"

Claim 9, Col. 24, line 8:

after "modulated" insert "light"

Signed and sealed this 29th day of May 1973.

(SEAL)
Attest:

EDWARD M. FLETCHER, JR.
Attesting Officer

ROBERT GOTTSCHALK
Commissioner of Patents